United States Patent
Srivastav et al.

(10) Patent No.: US 12,436,261 B1
(45) Date of Patent: Oct. 7, 2025

(54) RADAR DOUBLE BOUNCE DETECTION

(71) Applicant: Zoox, Inc., Foster City, CA (US)

(72) Inventors: Arvind Srivastav, San Francisco, CA (US); Jifei Qian, San Jose, CA (US); Yifan Zuo, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 287 days.

(21) Appl. No.: 18/140,880

(22) Filed: Apr. 28, 2023

(51) Int. Cl.
*G01S 13/58* (2006.01)
*G01S 7/02* (2006.01)
*G01S 13/72* (2006.01)
*G01S 13/931* (2020.01)

(52) U.S. Cl.
CPC ............ *G01S 13/584* (2013.01); *G01S 7/023* (2013.01); *G01S 13/726* (2013.01); *G01S 2013/93271* (2020.01)

(58) Field of Classification Search
CPC ...... G01S 13/931; G01S 13/584; G01S 13/88; G01S 13/886; G01S 13/52; G01S 13/91; G01S 13/56; G01S 13/726
USPC .............. 342/70, 107, 149, 25 C, 29, 36, 37
See application file for complete search history.

(56) References Cited

U.S. PATENT DOCUMENTS

| | | | |
|---|---|---|---|
| 9,291,699 B2 * | 3/2016 | Sadr .................... | G06K 7/10366 |
| 10,649,459 B2 | 5/2020 | Wang et al. | |
| 11,891,081 B2 * | 2/2024 | Sakamoto ............. | B60W 40/09 |
| 12,162,512 B2 * | 12/2024 | Li ............................ | G06F 18/25 |
| 2008/0266169 A1 * | 10/2008 | Akita .................... | G01S 13/931 342/117 |
| 2020/0410853 A1 * | 12/2020 | Akella ................. | G05D 1/0055 |
| 2021/0055378 A1 * | 2/2021 | Van Haver ............ | G01S 13/867 |
| 2021/0354717 A1 * | 11/2021 | Sakamoto ............. | B60W 40/09 |
| 2023/0003871 A1 | 1/2023 | Qian et al. | |
| 2023/0103178 A1 * | 3/2023 | Li ........................... | G01S 7/295 701/23 |
| 2023/0127044 A1 * | 4/2023 | Takagi ................. | B60W 30/09 701/301 |

\* cited by examiner

Primary Examiner — Michael W Justice
(74) Attorney, Agent, or Firm — Lee & Hayes, P.C.

(57) ABSTRACT

Techniques for detecting radar data inaccuracies using a multistage filtering technique are discussed herein. A vehicle may capture radar data including a set of radar points. The vehicle can input the radar data into a machine-learning model configured to detect objects and/or generate bounding boxes associated with such detected objects. In some instances, the vehicle may cluster the radar points such that a cluster includes the radar points located proximate to and/or within a bounding box. To identify double bounce object detections, the vehicle may determine whether a detected object is a false-positive double bounce object detection based on evaluating the azimuth, range, and relative velocity double bounce criteria. Based on the detected object satisfying the double bounce criteria for azimuth, range, and relative velocity, the vehicle may modify the radar data.

20 Claims, 9 Drawing Sheets

RADAR DOUBLE BOUNCE DETECTION

BACKGROUND

Sensors, such as radar sensors, generally measure the distance from a radar device to the surface of an object by transmitting a radio wave and receiving a reflection of the radio wave from the surface of the object, which may be read by a sensor of the radar device. The sensor may generate a signal based on a radio wave returning to the sensor. Radar return signals may be attributable to reflections of objects, but portions of radar signals also may be attributable to noise and/or other interfering signals (e.g., from the radar device itself or from an external source). Within the context of vehicles (such as autonomous vehicles), radar systems may be used to detect objects in driving environments, analyze the objects, and/or determine routes for the vehicle to navigate through the environment safely and efficiently. For example, an autonomous vehicle may use radar data to detect and avoid obstacles, such as pedestrians, within a planned driving path. However, in some cases, radar noise and interference may cause errors in the analysis of radar data, such as false-positive object detections. Such radar data analysis errors can present challenges to safely and comfortably traversing through the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
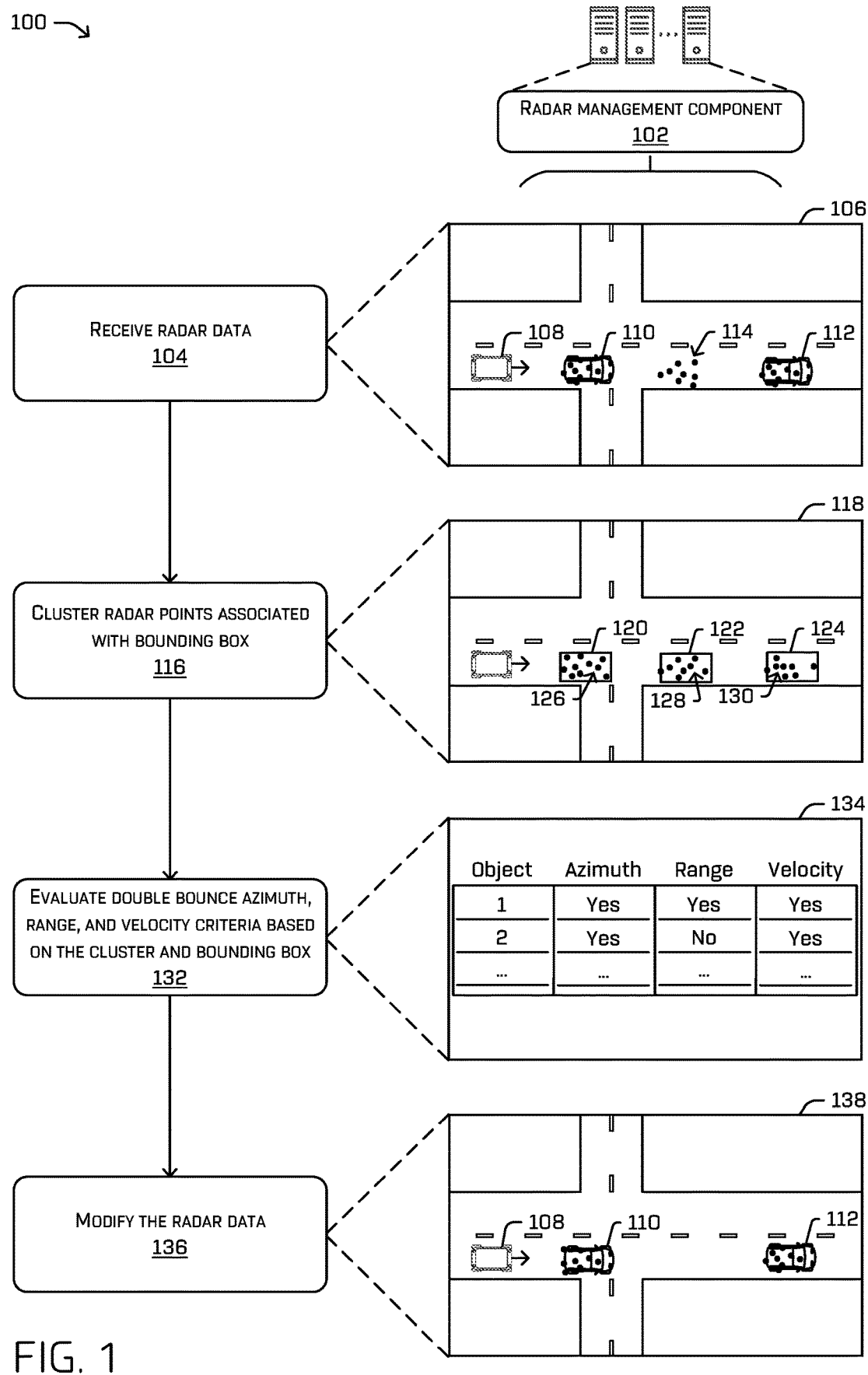
FIG. 1 is a pictorial flow diagram illustrating an example technique for modifying received sets of radar data based on evaluating azimuth, range, and velocity values of a candidate double bounce object detection, in accordance with one or more examples of the disclosure.

As discussed above, inaccurate radar data may cause errors when one or more components of a vehicle evaluate the radar data. Such errors may include a false-positive double bounce object detection. A double bounce radar return may occur when a radar device transmits a radio wave which initially reflects off an object (e.g., a vehicle, pedestrian, bicycle, sign, etc.) and subsequently reflects off the vehicle (e.g., upon which the radar device is located) which causes the radio wave to travel to, and reflect off, the object. Upon reflecting off the object a second time, the radio wave may subsequently return to the radar device. Further, radar data analysis errors can present challenges to safely and comfortably traversing through an environment.

Techniques for detecting radar data inaccuracies using a multistage filtering technique are discussed herein. As described herein, clusters of radar points may be determined, filtered, and/or modified to improve the accuracy of radar data. In some examples, a vehicle (such as an autonomous vehicle) may capture radar data and process such radar data to determine a set of radar points. The vehicle can input the radar data into a machine-learning model trained to output object detections and/or bounding boxes associated with such object detections. In some instances, the vehicle may cluster the radar points such that a cluster can be associated with a bounding box corresponding to a detected object. To determine whether an object detection is a double bounce object detection, the vehicle may utilize a bounding box and/or a cluster corresponding to the object detection to determine if the detected object satisfies azimuth, range, and velocity double bounce criteria. The vehicle may modify the clustered radar points or bounding box to remove or mitigate the erroneous radar detections based on the detected object satisfying the double bounce criteria. As discussed throughout this disclosure, the techniques described herein may improve vehicle safety and driving efficiency by ensuring accurate radar data is being used and evaluated by the vehicle, thereby generating more efficient and accurate vehicle actions.

When using radar devices to detect objects in an environment, conventional systems may inaccurately detect and/or misidentify objects based on radio waves reflecting off multiple surfaces in the environment (e.g., multipath reflection). As an example, vehicles may use radar devices to detect and/or identify objects within the environment. In some cases, a radar device may transmit a radio wave which may reflect off a single object within the environment and return to the radar sensor. In such cases, based on analyzing the radar data from the returned radio wave, the vehicle may determine a distance to the object from which the transmitted radio wave reflected, as well as an azimuth of the object, a velocity of the object, etc. Although object is used as an example, a radar device may process returns in a pointwise fashion wherein each return is associated with a corresponding point (e.g., of a point cloud). In certain examples referred to in this application, sensor data for object detection and point detection may be interchangeable. In examples, data regarding points may be processed by a machine-learned model to determine features (e.g., velocity, position, etc.) of an object including the point. In some examples, a 4D radar may be used including heigh information. Although points are used as an example, radar data may be represented in a variety of ways to which the disclosed techniques may be applicable.

However, in other examples, from the time the radio wave is transmitted to the time the radio wave returns to the radar device, the radio wave may reflect off multiple objects or a single object multiple times within the environment. In such examples, the radar data received based on the radio wave may be inaccurate, as some of the radar parameters may be indicative of multiple reflections, resulting in a "mirrored"

radar return. Accordingly, the radar device may falsely detect and/or misclassify objects within the environment based on the inaccurate radar data. Of course, this is a single example illustrating one or multiple errors associated with radar data that may be resolved using the techniques described herein.

As an example illustrating a double bounce (e.g., multipath) radar return, a radar device may transmit a radio wave which may initially reflect off an object (e.g., a vehicle, pedestrian, bicycle, sign, etc.) within the environment. After reflecting off the object, the radio wave may subsequently reflect off the vehicle (e.g., upon which the radar device is located) which may cause the radio wave to travel to, and reflect off, the object. Upon reflecting off the object a second time, the radio wave may subsequently return to the radar device. In such examples, the azimuth parameter of the radar return signal may correspond to the azimuth of the object, since the object was the last surface from which the radio wave reflected. However, the range parameter of the radar return signal may indicate that the detected object is at a range approximately twice the range of the actual object. This is because the radar system may assume that each return corresponds to an emission that directly bounces off of a surface in the environment as the sensor generally has no knowledge otherwise. As such, the range parameter may be larger than the true range value. Further, the relative velocity (e.g., doppler) parameter of the radar return signal may indicate that the detected object is traveling at approximately twice the relative velocity of the actual object. As such, the velocity parameter may be higher than the actual objects velocity. In some cases, double bounce radar signal may cause the radar device to detect an actual object at an inaccurate location. Additionally or alternatively, the radar device may falsely determine a detection of a non-existent object at a location behind an actual object. In some examples, as the vehicle navigates throughout the environment, the vehicle may determine that a "mirrored" object (e.g., a false positive object detection behind an actual object) has a trajectory that may intersect or otherwise affect the trajectory of the autonomous vehicle. Consequently, the autonomous vehicle may disengage from the trajectory, determine alternative and unnecessary trajectories, and/or transition from an autonomous driving mode to a manual driving mode based on the detection of the mirrored object.

To address these and other technical problems and inefficiencies, the systems and/or techniques described herein include a radar management system (which also may be referred to as a "radar management component" or "radar manager") configured to detect double bounce radar signals in radar data caused by radio waves reflecting off a single object multiple times prior to returning to the radar sensor. The radar management component may leverage such techniques to refine and/or modify the radar data based on double bounce detections. Technical solutions discussed herein solve one or more technical problems associated with conventional radar analysis techniques resulting in inaccurately detected objects, misidentified objects, and/or inaccurate vehicle actions.

Initially, a radar management component may receive radar data from one or more radar sensors of an autonomous vehicle traversing within an environment. In some examples, the autonomous vehicle may include multiple radar devices configured to receive radar data of the environment. Further, each radar device may provide unique radar data representative of the perspective of the radar device. Such radar devices may be a same or different type of radar device configured to capture different types (or parameters) of radar data, including but not limited to range data, azimuth data, doppler data, RCS data, elevation data, etc. In some examples, the radar data may include a set of radar points representative of radar detections of physical objects in the environment.

In some examples, the radar management component may detect one or more objects in the environment based on the radar data. The autonomous vehicle may input the radar data into a machine-learning model trained to output object detections and/or bounding boxes associated therewith. In some examples, an object detection may include various types of objects, such as a vehicle, a pedestrian, a cyclist, a sign, and/or any other type of object. The bounding box may be a minimum volume cuboid which encompasses an object. The two-or three-dimensional bounding box can provide information about the type of object such as the spatial location (e.g., azimuth, range, elevation, etc.) of any position of the object and/or bounding box, an orientation of the object, a size and/or extent of the bounding box, a center of the bounding box, as well as the size for the object it contains. Example techniques for determining bounding boxes based on sensor data can be found, for example, in U.S. Patent Pub. No. 2023/0003871, filed Jun. 30, 2021, and titled "Associating Radar Data With Tracked Objects" the contents of which is herein incorporated by reference in its entirety and for all purposes.

In some examples, the radar management component may determine a cluster of radar points. The radar management component may cluster the radar points such that a cluster includes the radar points located proximate to and/or within a bounding box. For example, the radar management component may identify or otherwise determine azimuth value(s) and/or range value(s) of the bounding box. In such examples, the radar management component may determine a cluster (e.g., subset) of radar points based on identifying radar points with azimuth and/or range values that fall within the azimuth and/or range values of the bounding box. In such instances, the bounding box and the cluster of radar points may be associated with the same object.

In some examples, the radar management component may determine whether one or more of the detected objects are false positive double bounce object detections. A double bounce radar return may be a type of multipath radar return. Specifically, double bounce radar returns occur when a radar device transmits a radio wave that first reflects off an object and subsequently reflects off the vehicle (upon which the radar device is located), and proceeds to reflect off the object for a second time prior to returning to the radar sensor. In such examples, a double bounce radar return may have a similar azimuth as the object (e.g., base object), while having approximately twice the velocity and range values compared to the object. Thus, as described below, the radar management component may evaluate the double bounce criteria (e.g., azimuth, range, and velocity) to determine whether the object detections are double bounce object detections.

In some examples, the radar management component may determine whether a detected object is within a region of interest which may be represented by a range of azimuth values. A region of interest may be any portion of the environment that is of importance to the vehicle. In some examples, the environment may include one or more objects at various locations. As some objects may be outside the region where double bounce detections affect the current and/or future actions of the vehicle (e.g., along the side of the vehicle), the radar management component may determine a range of azimuth values (e.g., region of interest) and filter out any detected objects that are outside the range. Filtering such object detections out may reduce processing requirements and/or the amount of data to process. In some instances, the radar management component may determine the range of azimuth values for any radar device located on the vehicle. In such instances, the range of azimuth values may differ based on the radar type, the radar device location, the environment type, and/or any other factor. The radar management component may filter out object detections that are located outside of the range of azimuth values. In such instances, filtered out object detections may not be evaluated when performing operations related to the double bounce criteria.

In some examples, the radar management component may identify a base object prior to performing operations related to the double bounce criteria. A base object may be an actual object detection that is located between the vehicle and the other detected objects. In some examples, the radar management component may select or otherwise determine one or more detected objects to be the base object. In such instances, the radar management component may perform the techniques described herein based on a first base object, and perform the techniques additional times based on determining or otherwise selecting a second base object. Of course, the radar management component may perform the double bounce filtering techniques one or more times, utilizing one or more different base objects from the perspective of one or more different radar devices.

In some examples, the radar management component may determine whether an object detection satisfies the double bounce azimuth criteria. The double bounce azimuth criteria may include determining whether the object detection is located within a frustrum defined by the base object. The frustrum may be a cone shaped region covering a range of azimuth values within which double bounce object detections may be located. For example, the radar management component may determine a frustrum extending from the radar device to the bounding box associated with the base object. In some instances, the sides of the frustrum may be defined by the extent of the bounding box of the base object. Upon determining the frustrum, the radar management component may determine whether the bounding box of the object detection is located within the frustrum. In such cases, the radar management component may identify a center of the bounding box (of the object detection), and determine whether the center is located within the frustrum. If the center is located within the frustrum, the radar management component may determine that detected object satisfies the double bounce azimuth criteria and may be a double bounce object detection. In contrast, if the center is located outside of the frustrum, the radar management component may determine that the candidate object is not a false positive double bounce object detection.

In some examples, the radar management component may determine whether the detected object satisfies the double bounce range criteria by determining that the detected object has a range that is twice that of the base object. For example, when determining the range of the base object, the radar management component may identify a radar point of the cluster (corresponding to the base object) that is closest (e.g., has the smallest range) to the radar device, in addition to identifying a center of the cluster. The radar management component may determine the center of the cluster by averaging range and/or azimuth data of the radar points within the cluster. Based on identifying the closest radar point and the center of the cluster, the radar management component may determine a first range value for the closest radar point and a second range value for the center of the cluster. In such examples, the radar management component may determine an overall range from the radar device to the base object by determining a weighted range based on the first range value and the second range value. For instance, the radar management component may apply different weight values to the two range values and aggregate the results. In some examples, the radar management component may perform the same or similar range determining operations to determine the overall range from the radar device to the object detection.

Based on determining a first overall range of the base object and a second overall range of the object detection, the radar management component may determine if the second overall range is twice that of the first overall range. For example, the radar management component may subtract half of the second overall range from the first overall range and compare the result to a threshold range (e.g., threshold tolerance). If the overall range of the object detection is twice that of the base object, the result of subtracting half of the second overall range from the first overall range may be approximately zero. The threshold range may be determined based on a variety of factors, such as a diagonal, horizontal, and/or vertical length (or a portion thereof) of the bounding box of the base object, an azimuth of the base object from the perspective of the radar device (e.g., increase threshold range based on azimuth values further from "0", decrease threshold range based on azimuth values closer to "0", etc.), a velocity (or relative velocity) of the vehicle or the base object, a distance between the vehicle and the based object, and/or any other factor. If the result is within the threshold range, the radar management component may determine that the object detection satisfies the double bounce range criteria and may be a double bounce object detection. In contrast, if the result is outside the threshold range, the radar management component may determine that the object detection is not a double bounce object detection.

In some examples, the radar management component may determine whether the relative velocity of the object detection satisfies the double bounce velocity criteria by determining that the object detection has a relative velocity that is twice that of the relative velocity of the base object. For example, when determining the relative velocity of the base object, the radar management component may determine a first velocity of the cluster of radar points corresponding to the base object. The radar management component may determine the first velocity by averaging the individual velocity values for some or all radar points within the cluster. Further, the radar management component may determine a second velocity of the cluster of radar points corresponding to the object detection by averaging the individual velocity values for some or all radar points within the cluster. Upon determining the first velocity of the base object and the second velocity of the object detection, the radar management component may determine a first relative velocity for the base object and a second relative velocity of the object detection. The first relative velocity may be determined by comparing the velocity of the vehicle with the first velocity of the base object, and the second relative velocity may be determined by comparing the velocity of the vehicle with the second velocity of the object detection.

In some examples, the radar management component may determine whether the second relative velocity of the object detection is twice the first relative velocity of the base object. For example, the radar management component may subtract half of the second relative velocity from the first relative velocity and compare the result to a threshold range (e.g., threshold tolerance). The threshold range may be determined based on a variety of factors, such as a velocity (or a portion thereof) of the vehicle, base object, and/or object detection, the environment type, the road geometry, and/or any other factor. If the result is within the threshold range, the radar management component may determine that the object detection satisfies the double bounce velocity criteria and may be a double bounce object detection. In contrast, if the result is outside the threshold range, the radar management component may determine that the object detection is not a double bounce object detection.

In some examples, the radar management component may determine whether the object detection is a false-positive double bounce object detection. Based on evaluating the azimuth, range, and velocity double bounce criteria, if the object detection satisfies all of the criteria, the radar management component may determine that the object detection may be a double bounce detection. In contrast, if the object detection fails to satisfy one or more of the double bounce criteria, the radar management component may determine that the object detection is not a false-positive double bounce object detection. Of course, this example is not intended to be limiting, and other examples the radar management component may determine that the object detection is a double bounce object detection if one or more of the criteria are not satisfied.

Alternatively or additionally, the radar management component may evaluate the number of radar points corresponding to the identified double-bounce object detection. In some examples, based on the radar points of the double bounce radar points having a longer time of flight (e.g., twice the range of the base object), such radar points may have lower power and as such some radar points may not be detected. As such, double bounce object detections may have less radar points than the number of radar points corresponding to the base object. For instance, the radar management component may determine a first quantity of radar points within the cluster that correspond to the double bounce object detection and compare the first quantity to a second quantity of radar points within the cluster that corresponds to the base object. If the first quantity (e.g., double bounce object detection) is less than the second quantity (e.g., base object), then the radar management component may determine or otherwise confirm that the object detection is a double bounce detection. In contrast, if the first quantity is greater than or equal to the second quantity, the radar management component may determine that the object detection is not a double bounce detection.

In some examples, the radar management component may modify the cluster of radar points. Based on the radar management component determining that the object detection is a false-positive double bounce object detection, the radar management component may modify the cluster of radar points corresponding to the object detection. In some examples, the radar management component may modify the cluster based on a variety of techniques, such as removing and/or discarding the cluster of radar points and/or the associated bounding box, assigning a low confidence level to the cluster of radar points and/or the associated bounding box, assigning a label indicating that the cluster (and/or bounding box) is a double bounce object, and/or any other technique. Upon modifying the cluster of radar points and/or bounding box, the radar management component may send the modified subset of radar points to one or more of perception, prediction, and/or planning components for further processing. In such examples, the modified subset of radar data may be analyzed and processed in detecting objects, classifying objects, predicting trajectories, and/or planning future vehicle actions.

As illustrated by these examples, the techniques described herein can improve the functioning, safety, and efficiency of autonomous and semi-autonomous vehicles operating in various driving environments. The use of double bounce detecting techniques described herein may allow the vehicle to more efficiently and accurately detect double bounce returns captured by radar devices on the vehicle. Such techniques include filtering out candidate objects which are outside a range of azimuth values which may significantly reduce the number of objects detections to consider. By reducing the number of candidate objects to consider, the radar management component may reduce the size of data to be processed. These techniques can also reduce the amount of radar data processing time and overhead, without reducing the radar data accuracy (or by minimizing any reduction of accuracy) of detecting double bounce radar points, which can reduce the latency of processing components. Reducing latency can improve safety outcomes and/or comfort levels by controlling an autonomous vehicle, for example, by altering the vehicle trajectory or performing other driving maneuvers safely in the environment.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or robotic platform), and are not limited to autonomous vehicles. In one example, similar techniques may be utilized in driver-controlled vehicles in which such a system may provide an indication of whether it is safe to perform various maneuvers. In other examples, any or all of the techniques described herein may be implemented in other machine vison systems, such as security systems, object inspection and/or quality assurance systems, environment monitoring systems, etc. Moreover, even though the vehicles described herein are depicted as land vehicles, in other examples such vehicles may be aircraft, spacecraft, watercraft, and/or the like. Additionally, the techniques described herein may be used with real data (e.g., captured using sensor(s)), simulated data (e.g., generated by a simulator), or any combination of the two.

FIG. 1 is a pictorial flow diagram illustrating an example process 100 for modifying received sets of radar data based on evaluating azimuth, range, and velocity values of a candidate double bounce object detection. As shown in this example, some or all of the operations in the example process 100 may be performed by a radar management component 102 integrated into a radar device and/or within a perception component, a prediction component, a planning component, and/or other components and systems within an autonomous vehicle. For instance, as shown in this example, example process 100 may be implemented using a radar management component 102. As described below in more detail, the radar management component 102 may include various components, such as an object detecting component, a clustering component, an attribute evaluating component, and/or a radar data modifying component which may be configured to evaluate and identify false-positive double bounce object detections.

At operation 104, the radar management component 102 may receive radar data collected by one or more radar devices of an autonomous vehicle. In some examples, a vehicle may include multiple radar devices mounted at various locations and various angles relative to the vehicle, to capture radar data of a driving environment. For example, box 106 illustrates an autonomous vehicle 108 navigating an environment and capturing radar data reflected from a plurality of objects. In this example, the autonomous vehicle 108 may be driving behind a first object 110 and a second object 112 (which in front of the first object 110). As shown in box 106, the first object 110 may be a vehicle and the second object 112 may be a vehicle. In other examples, the radar data captured by a radar device may include any number of objects, each of which may be any type of dynamic object (e.g., vehicles, motorcycles, bicycles, pedestrians, animals, etc.) or static object (e.g., buildings, road surface features, trees, signs, barriers, parked vehicles, etc.). In other examples, there may be more or less objects at various locations within the environment.

As shown in box 106, the radar management component 102 may receive radar points 114 from the radar device. The radar points 114 may correspond to radio waves that have reflected off the first object 110 (two or more times) and the vehicle 108 prior to returning to the radar device. However, as shown in this example, the radar points 114 may have inaccurate range, azimuth, and/or velocity values, and thus may be located at a different position from the radar points of the first object 110. In this example, the radar points 114 may represent a set of radar detections based on radio waves which reflected off the first object 110 and then reflected off the vehicle 108, and subsequently reflect off the first object 110 prior to returning to the radar sensor located on the vehicle 108. As a result, the range values of the radar points 114 are incorrect and separated from a primary and accurate cluster of radar points of the first object 110. Specifically, the radar points 114 may indicate to the vehicle 108 that there is a third object at a range of a sum of the distance the radio wave traveled.

At operation 116, the radar management component 102 may cluster the radar points associated with a bounding box and/or an object detection. The autonomous vehicle may input the radar data received at operation 104 into a machine-learning model trained to output object detections and/or bounding boxes associated therewith. For example, box 118 illustrates clustered radar points and bounding boxes associated with the detected objects. In this example, based on inputting the radar data into the machine-learning model, the box 118 may include a first bounding box 120 that is associated with the first object 110, a second bounding box 122 that is corresponds to an object detection associated with the radar points 114, and a third bounding box 124 that corresponds to the second object 112. In some examples, the first, second, and third bounding boxes may include information about the type of object detection, the spatial location (e.g., azimuth, range, elevation, etc.) of the object detection, an orientation of the object detection, a center of the bounding box, as well as the size for the object it contains.

As shown in FIG. 1, box 118 may include a first cluster 126 of radar points that correspond to the first object 110 and/or the first bounding box 120, a second cluster 128 of radar points that correspond to the radar points 114 and/or the second bounding box 122, and a third cluster 130 of radar points that correspond to the second object 112 and/or the third bounding box 124. The radar management component 102 may determine the first, second, and third clusters such that each cluster includes the radar points located proximate to and/or within a bounding box. Additional details for clustering radar points are described with respect to FIGS. 2 and 4A.

At operation 132, the radar management component 102 may evaluate double bounce azimuth, range, and velocity criteria based on the cluster and/or bounding box information. A double bounce radar detection may have a similar azimuth as the actual object (e.g., base object), while having approximately twice the relative velocity and range values of the actual object. Thus, the radar management component 102 may evaluate the various double bounce criteria (e.g., azimuth, range, and velocity) to determine whether the object detections are false-positive object detections. To evaluate the double bounce criteria, the radar management component 102 may select a base object from the detected objects. The radar management component 102 may perform the operations described herein based on the base object. For example, box 134 illustrates an example table depicting whether detected objects satisfy certain double bounce criteria. In this example, the example table may include four columns and three or more rows. The example table includes column categories that include object, azimuth, range, and/or velocity. In this example, the object column may identify the detected object being evaluated. Further, the azimuth column may depict whether the object satisfies the azimuth double bounce criteria. The range column may depict whether the object satisfies the range double bounce criteria, while the velocity column may depict whether the object satisfies the velocity double bounce criteria.

In this example, the object column may include object 1 which may correspond to the object detection associated with the second cluster 128 and the second bounding box 122, and object 2 which may correspond to the object detection associated with the second object 112, the third cluster 130, and/or the third bounding box 124. Further, the first object 110 (and the associated first cluster 126 and first bounding box 120) may be the base object. However, this is not intended to be limiting, in other examples, the radar management component 102 select a different detected object to be the base object.

As shown in box 134, object 1 and object 2 satisfy the azimuth double bounce criteria. The radar management component 102 may determine whether objects 1 or 2 are located within a frustrum (e.g., range of azimuth values) as defined by the base object. If the first or second objects are located within the frustrum, the radar management component 102 may determine that detected object satisfies the double bounce azimuth criteria and may be a double bounce object detection. Additional details for evaluating double bounce azimuth criteria are described with respect to FIGS. 2 and 4B.

In this example, the example table illustrates that object 1 (e.g., second cluster 128) satisfies the range double bounce criteria while object 2 (e.g., third cluster 130) does not satisfy the range double bounce criteria. The radar management component 102 may determine whether objects 1 or 2 have a range that is twice that of the base object (e.g., the first object 110). If the range values of the first or second objects are twice the range of the base object, the radar management component 102 may determine that detected object satisfies the double bounce range criteria and may be a double bounce object detection. Additional details for evaluating double bounce range criteria are described with respect to FIGS. 2 and 4C.

As shown in box 134, object 1 and object 2 satisfy the velocity double bounce criteria. The radar management component 102 may determine whether objects 1 or 2 have a velocity that is twice that of the base object (e.g., the first object 110). If the relative velocity of the first or second objects are twice the relative velocity of the base object, the radar management component 102 may determine that detected object satisfies the double bounce velocity criteria and may be a double bounce object detection. Additional details for evaluating double bounce velocity criteria are described with respect to FIGS. 2 and 4C.

At operation 136, the radar management component 102 may modify the radar data based on determining that an object detection is a double bounce object detection. In some examples, the radar management component 102 may modify the radar data received in operation 104 by removing and/or discarding the cluster of radar points which is identified as a double bounce cluster. For instance, box 138 illustrates an example in which the radar management component 102 has modified the radar data by removing the radar points 114 (or the second cluster 128) which were identified in operation 132 as being double bounce object detections. As shown in box 138, the radar data has been modified to remove the radar points 114 from the driving environment. Additionally or alternatively, the radar management component 102 may modify the radar data by assigning a low confidence level to the radar points 114.

Figure 2:
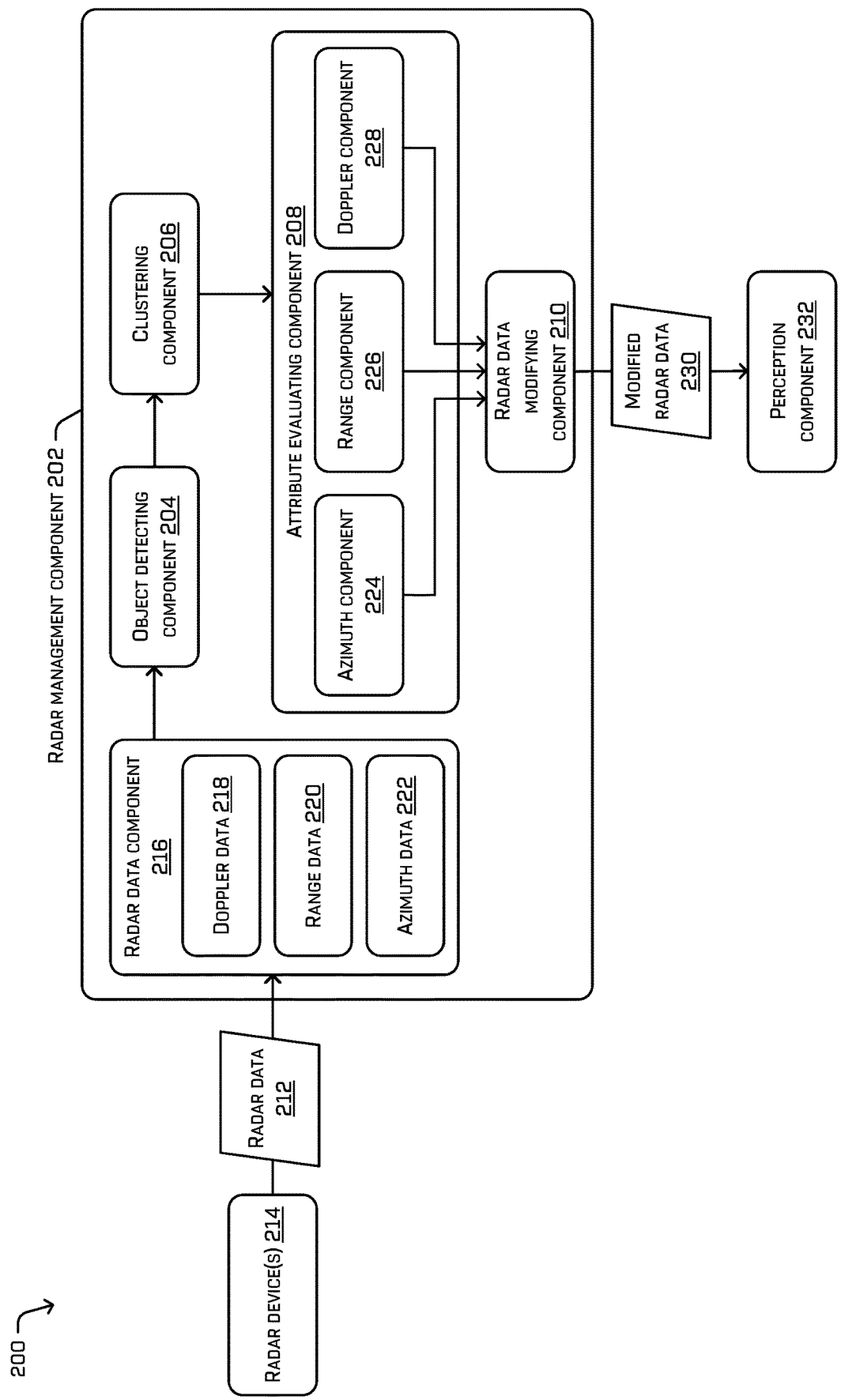
FIG. 2 illustrates an example computing system including a radar management component configured to modify radar data based on a detected double bounce radar point, in accordance with one or more examples of the disclosure.

FIG. 2 illustrates an example computing system 200 including a radar management component 202 configured to modify radar data based on detected double bounce radar points.

In some examples, the radar management component 202 may be similar or identical to the radar management component 102 described above, or in any other examples herein. As noted above, in some cases the radar management component 202 may be implemented within or otherwise associated with a perception component, prediction component, and/or planning component of an autonomous vehicle. In some examples, the radar management component 202 may include various components described below, configured to perform different functionalities of a technique for analyzing and/or modifying radar data. For instance, the radar management component 202 may include an object detecting component 204 configured to detect objects in the environment, a clustering component 206 configured to determine one or more clusters of radar points that are associated with the detected objects, an attribute evaluating component 208 configured to evaluate and/or compare the azimuth, range, and velocity values of various objects to double bounce criteria, and/or a radar data modifying component 210 configured to modify the set of radar points.

In some examples, the radar management component 202 may receive radar data 212 from one or more radar device(s) 214 within (or otherwise associated with) an autonomous vehicle. Different radar device(s) 214 may be mounted or installed at different locations on the autonomous vehicle, and may include various types of radar devices providing various elements (or parameters) of radar data 212 to the radar management component 202. As shown in FIG. 2, a radar device 214 may provide radar data 212 to the radar management component 202. In some instances, the radar management component 202 may include a radar data component 216 configured to receive, store, and/or synchronize radar data 212 from the radar device 214 (e.g., and any additional radar devices). The radar data component 216 may include various subcomponents, described below, to receive, store, synchronize, and/or analyze the radar data 212. A radar device 214 may capture any number of parameters of radar data component 216 from any number of radar devices. As shown in FIG. 2, the illustrated subcomponents are some of the possible radar data parameters that a radar device may capture. In some examples, a radar device may capture more or less than the illustrated radar data components shown in FIG. 2.

In this example, the radar data component 216 may include one or more subcomponents associated with different radar data components (or parameters). As illustrated in FIG. 2, the radar device 214 may capture radar data 212, including a doppler data component 218, a range data component 220, and an azimuth data component 222. In some examples, depending on the type of radar device 214, the radar device 214 may capture additional or fewer radar data parameters. In this example, the doppler data component 218 may be used to determine, store, and/or synchronize a radial velocity of detected objects relative to and/or from the frame of reference of the radar device 214. The range data component 220 may be used to receive, store, and/or synchronize the distance of detected objects relative to and/or from the frame of reference of the radar device(s) 214. The azimuth data component 222 may be used to determine, store, and/or synchronize a direction (or bearing) of detected objects relative to and/or from the frame of reference of the radar device(s) 214. In some instances, the doppler, the azimuth, and/or the range measurements may be determined from the location of the radar device as opposed to an object (e.g., vehicle) to which the radar device is attached to. Determining such measurements from the location of the radar device may result in a measurement from the edge, side, or corner of the vehicle which may provide more accurate representations of the object's velocity, range, and azimuth.

In some examples, the radar management component 202 may include an object detecting component 204 configured to detect objects in the environment. The object detecting component 204 may receive the radar data 212 including one or more radar parameters from the radar data component 216. In some examples, the object detecting component 204 may input the radar data 212 into one or more machine-learning models trained to output object detections and/or bounding boxes associated therewith. As described above, an object detection may include various types of objects, such as a vehicle, a pedestrian, a bicycle, a sign, and/or any other type of object.

In some examples, the radar management component 202 may include a clustering component 206 configured to determine one or more clusters of radar points that are associated with the detected objects. The clustering component 206 may receive the radar data 212, the detected objects, and/or bounding boxes from object detecting component 204, the radar data component 216, and/or any other component. The clustering component 206 may determine clusters (e.g., subsets, portions, etc.) of radar points from the radar data. In some instances, the clustering component 206 may determine the clusters such that a cluster includes the radar points that are located proximate to and/or within the bounding box. Initially, the clustering component 206 may identify a range of azimuth and/or range values for the bounding box. Such a range of azimuth and/or range values may indicate where the bounding box is located relative to the radar device 214. Based on determining the range of azimuth and range values for the bounding box, the clustering component 206 may determine a cluster of radar points which have azimuth and range values that fall within the range of azimuth and range values of the bounding box. In some instances, the clustering component 206 may cluster some or all of the radar points of the radar data.

In some examples, the radar management component 202 may include an attribute evaluating component 208 configured to evaluate and/or compare the azimuth, range, and velocity values of various objects to double bounce criteria. The attribute evaluating component 208 may receive clusters of radar points and/or bounding boxes from the clustering component 206 or any other component within the radar management component 202. The attribute evaluating component 208 may determine whether one or more of the detected objects are false-positive double bounce object detections. Thus, the attribute evaluating component 208 may evaluate various double bounce criteria (e.g., azimuth, range, and velocity) to determine whether the object detections are double bounce object detections.

In some instances, the attribute evaluating component 208 may identify a base object which may be utilized when performing the double bounce operations. As described above, a base object may be one of the detected objects that is located between the vehicle and the other detected objects. In some cases, the vehicle may have a line of sight to the base object. The line of sight may be established based on sensor data and map data to ensure that there are no static or dynamic objects between the vehicle and the base object. In some examples, the attribute evaluating component 208 may perform the double bounce operations one or more times using one or more different base objects. In some instances, the attribute evaluating component 208 may determine or otherwise select the base object based on the location of the radar device on the vehicle, the field of view of the radar device, and/or any other factor.

In some examples, the attribute evaluating component 208 include subcomponents which may include an azimuth component 224, a range component 226, and a doppler component 228. The azimuth component 224 may be configured to determine whether an object detection satisfy the azimuth criteria for a double bounce detection. The double bounce azimuth criteria may include determining whether a center of the bounding box associated with the object detection is located within a frustrum that is defined by the base object. The frustrum may be a cone shaped region covering a range of azimuth values within which double bounce detections may be located. In some instances, the azimuth component 224 may determine the frustrum starting from the radar device and extending towards the base object. Each side of the frustrum may be defined by the extent or edge of the bounding box of the base object. As such, the range of azimuth values included within the frustrum may vary based on the size, the orientation, and/or the distance from the vehicle to the bounding box of the base object. For instance, a base object that is a large truck with an orientation that includes a non-zero relative heading (compared to the vehicle heading) may cause the frustrum to include a larger range of azimuth values compared to a base object that is a small car that has a relative heading of zero.

Based on determining the frustrum, the azimuth component 224 may determine whether the bounding box for some or all of the detected objects is located within the frustrum. For example, for some or all bounding boxes, the azimuth component 224 may determine a center of the bounding box. The azimuth component 224 may determine whether the center for the bounding box is located within the frustrum. To determine whether the center of the bounding box is located within the frustrum, the azimuth component 224 may determine an azimuth and/or range value of the center and determine whether such values fall within the azimuth and range values covered by the frustrum. If the center of a bounding box is located within the range of azimuth values of the frustrum, the azimuth component 224 may determine that detected object satisfies the double bounce azimuth criteria and may be a double bounce object detection. In contrast, if the center of a bounding box is located outside the frustrum, the azimuth component 224 may determine that the detected object is not a double bounce object detection. In some examples, the azimuth component 224 or the attribute evaluating component 208 may send the results to the radar data modifying component 210.

In some examples, the range component 226 may be configured to determine whether the object detection satisfies the range criteria for a double bounce object detection. The double bounce range criteria may include determining whether a range of a detected object is approximately twice the range of the base object. The range component 226 may determine the range of the base object and the range of the one or more detected objects from the radar device on the vehicle. Of course, this is not intended to be limiting, in other examples the range component 226 may measure the range from one or more other locations of the vehicle.

In some examples, the range component 226 may determine a first range from the radar device to the base object, and a second range from the radar device to the detected object. For example, when determining the first range to the base object, the range component 226 may identify the cluster of radar points that are associated thereto. In such examples, the range component 226 may identify the radar point of the cluster that is closest to the radar device (e.g., has the shortest or smallest range value). Additionally, the range component 226 may identify a center of the cluster of radar points. The center of the cluster may be determined based on aggregating and/or averaging the range and/or azimuth values of the radar points within the cluster. The range component 226 may utilize the range of the closest radar point within the cluster and the range of the center of the cluster in order to determine an overall range for the base object. In some examples, the overall range may be a weighted range. In such instances, the range component 226 may apply different weight values to the two range values and sum the results. In some examples, the range component 226 may use a weighted range function to determine the overall range of the base object (or the object detection), such as according to the following:

$$\text{Overall Range} = 0.75 * \text{Range}_{Closest} \text{ Radar Point} + 0.25 * \text{Range}_{Center} \text{ of Cluster}$$

Where $\text{Range}_{Closest\ Radar\ Point}$ corresponds to the range of the closest radar point within the cluster relative to the radar device, and $\text{Range}_{Center\ of\ Cluster}$ corresponds to the range of the center of the cluster. Of course, though shown as 0.75 and 0.25 being the weights applied to the two range values, in other examples the range component 226 may apply different weight values.

In some examples, the range component 226 may determine a second range to the object detection based on performing the same or similar techniques as described with respect to determining the range of the base vehicle.

In some examples, the range component 226 may determine if the first range (e.g., of the base object) is twice the second range (e.g., of the detected object). The range component 226 may subtract half of the second range from the first range, and determine if the result is within a threshold tolerance. However, this is not intended to be limiting, in other examples the range component 226 may multiply the first range by two and determine whether the result is within a threshold tolerance. If the result is within the threshold tolerance, the range component 226 may determine that the detected object is approximately twice the range of the base object and may be a false-positive double bounce object detection. In contrast, if the result is outside the threshold tolerance, the range component 226 may determine that the detected object is not a false positive double bounce object detection.

In some examples, the range component 226 may determine the threshold tolerance based on any combination of a diagonal, horizontal, and/or vertical length (or a portion thereof) of the bounding box of the base object, an azimuth of the base object from the perspective of the radar device (e.g., larger azimuth values increases threshold tolerance, smaller azimuth values decrease threshold tolerance, etc.), a velocity of the vehicle or the base object, a distance between the vehicle and the based object, and/or any other factor.

In some examples, the doppler component 228 may be configured to determine whether the object detection satisfies the doppler (e.g., velocity) criteria for a double bounce detection. The double bounce velocity criteria may include determining whether a relative radial velocity (e.g., relative doppler value) of a detected object is approximately twice the relative radial velocity of the base object. The doppler component 228 may determine the relative velocity of the base object and the relative velocity of the one or more detected objects from the perspective of the radar device located on the vehicle. Of course, this is not intended to be limiting, in other examples the doppler component 228 may measure the velocity from one or more other locations of the vehicle.

In some examples, the doppler component 228 may determine a first relative velocity (e.g., doppler value) by comparing the velocity of the radar device to the velocity of the base object, and a second relative velocity (e.g., doppler value) by comparing the velocity of the radar device to the velocity of the detected object. For example, when determining the first relative velocity (e.g., relative doppler value) of the base object, the doppler component 228 may identify the cluster of radar points that are associated with the base object. In such instances, the doppler component 228 may determine a velocity of the cluster based on averaging the velocity of some or all of the radar points within the cluster. Further, the doppler component 228 may determine a second relative velocity of the detected object based on performing the same or similar techniques as described with respect to determining the first relative velocity of the base object.

In some examples, the doppler component 228 may determine if the first relative velocity (e.g., of the base object) is twice the second relative velocity (e.g., of the detected object). The doppler component 228 may subtract half of the second relative velocity from the first relative velocity, and determine if the result is within a threshold tolerance. However, this is not intended to be limiting, in other examples the doppler component 228 may multiply the first relative velocity by two and determine whether the result is within a threshold tolerance. If the result is within the threshold tolerance, the doppler component 228 may determine that the detected object has approximately twice the relative velocity of the base object and may be a false-positive double bounce object detection. In contrast, if the result is outside the threshold tolerance, the doppler component 228 may determine that the detected object is not a false-positive double bounce object detection.

In some examples, the range component 226 may determine the threshold tolerance based on any combination of a velocity (or a portion thereof) of the vehicle, a base object, and/or a candidate object, the environment type, the road geometry, and/or any other factor.

In some examples, the radar management component 202 may include a radar data modifying component 210 configured to modify the radar data. The radar data modifying component 210 may receive the clusters of radar points, bounding boxes, and/or any other information associated with the double bounce object detection. In such examples, the radar data modifying component 210 may modify the clustered radar points within the radar data in a variety of ways. For instance, the radar data modifying component 210 may modify the cluster of radar points by removing the cluster from the radar data, assigning a lower confidence level to the cluster of radar points associated with the false positive detection, and/or any other modifying action. However, these examples are not intended to be limiting, the radar data modifying component 210 may modify the radar data in any number of additional ways.

As shown in this example, the radar data modifying component 210 may send the modified radar data 230 to a perception component 232 for further processing. In such examples, based on the radar data modifying component 210 having modified the cluster of the set of radar points, the radar data modifying component 210 may send the modified radar data 230 to the perception component 232.

Figure 3:
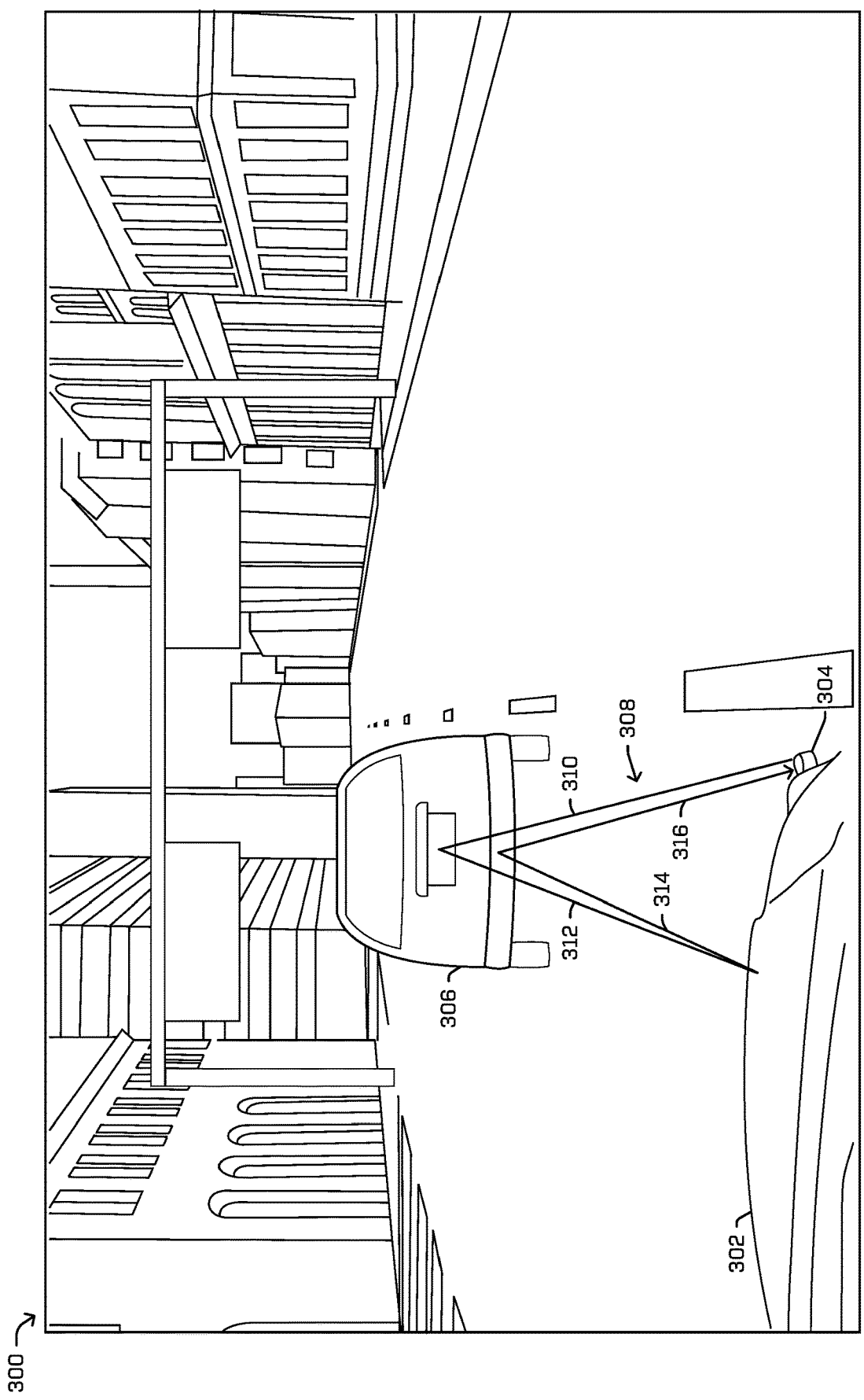
FIG. 3 depicts an example environment of a vehicle utilizing radar devices to capture radar data, in accordance with one or more examples of the disclosure.

FIG. 3 depicts an example environment 300 of a vehicle 302 utilizing radar devices to capture radar data. Specifically, FIG. 3 illustrates the path a radio wave takes to be considered a double bounce radar detection.

In some examples, the example environment 300 may include one or more objects. In such examples, the example environment 300 may include a vehicle 302. The vehicle 302 may include a radar device 304 configured to capture radar data of the example environment 300. The radar device 304 may transmit radio waves which reflect off surfaces within the example environment 300 and return to the radar device 304. In some examples, the radar device 304 may be used to determine a distance from the radar device 304 to objects within the example environment 300. In some examples, the example environment may also include an object 306. As shown, the object 306 may be a vehicle. However, in other examples the object 306 may be any other static or dynamic object. In this example, the vehicle 302 and may be navigating the example environment 300 behind the object 306.

In some examples, the radar device 304 may transmit a radio wave 308 within the example environment 300. As shown, the radio wave 308 may reflect off the object 306 multiple times. In this example, the radio wave 308 may include four different paths of travel. Initially, the radar device 304 may transmit the radio wave 308 along the first path 310 towards the object 306. Upon reaching the object 306, the radio wave 308 may reflect off the object 306 and follow a second path 312 back to the vehicle 302. Upon reaching the vehicle 302, the radio wave 308 may reflect off the vehicle 302 and follow the third path 314 back to the object 306. Upon reaching the object 306 for a second time, the radio wave 308 may reflect off the object 306 and follow a fourth path 316 back to the radar device 304. In some instances, the radar device 304 may receive the radio wave 308 from the fourth path 316.

In some examples, the vehicle 302 may analyze radar data associated with the radio wave 308. In such examples, the radar data associated with the radio wave 308 may indicate that the detected object has an azimuth value corresponding to the object 306, while indicating that the detected object has a range value (e.g., distance from the radar device 304) corresponding to the sum of the distance the radio wave 308 traveled along the first path 310 and the third path 314. Accordingly, the vehicle 302 may determine that the radar data associated with the radio wave 308 may indicate the presence of a detected object which is occluded behind the object 306.

Figure 4A:
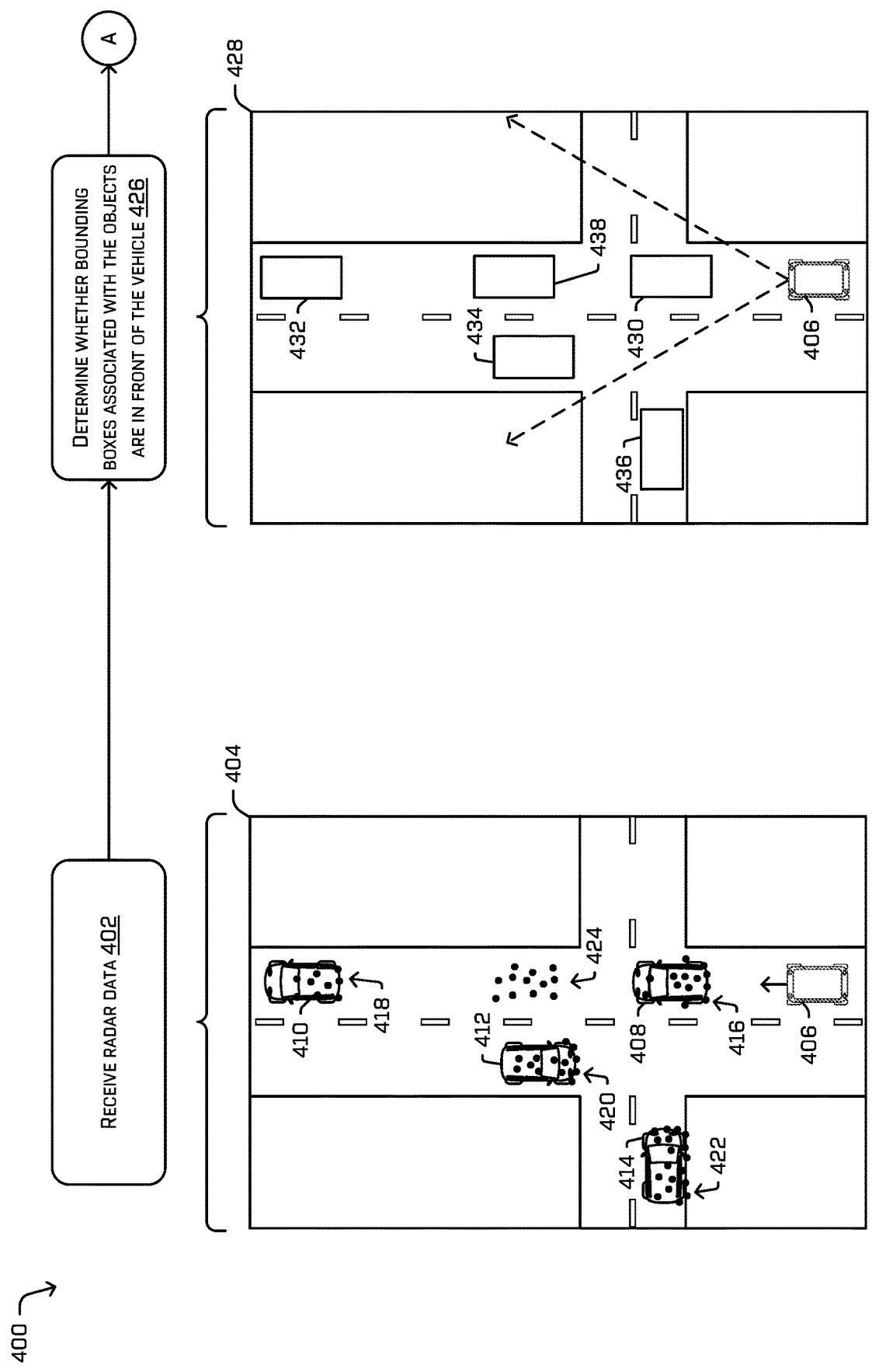
FIGS. 4A-4C illustrate a pictorial flow diagram of an example process for receiving radar data, detecting double bounce object detections, and modifying the radar data based on the double bounce object detections, in accordance with one or more examples of the disclosure.
Figure 4B:
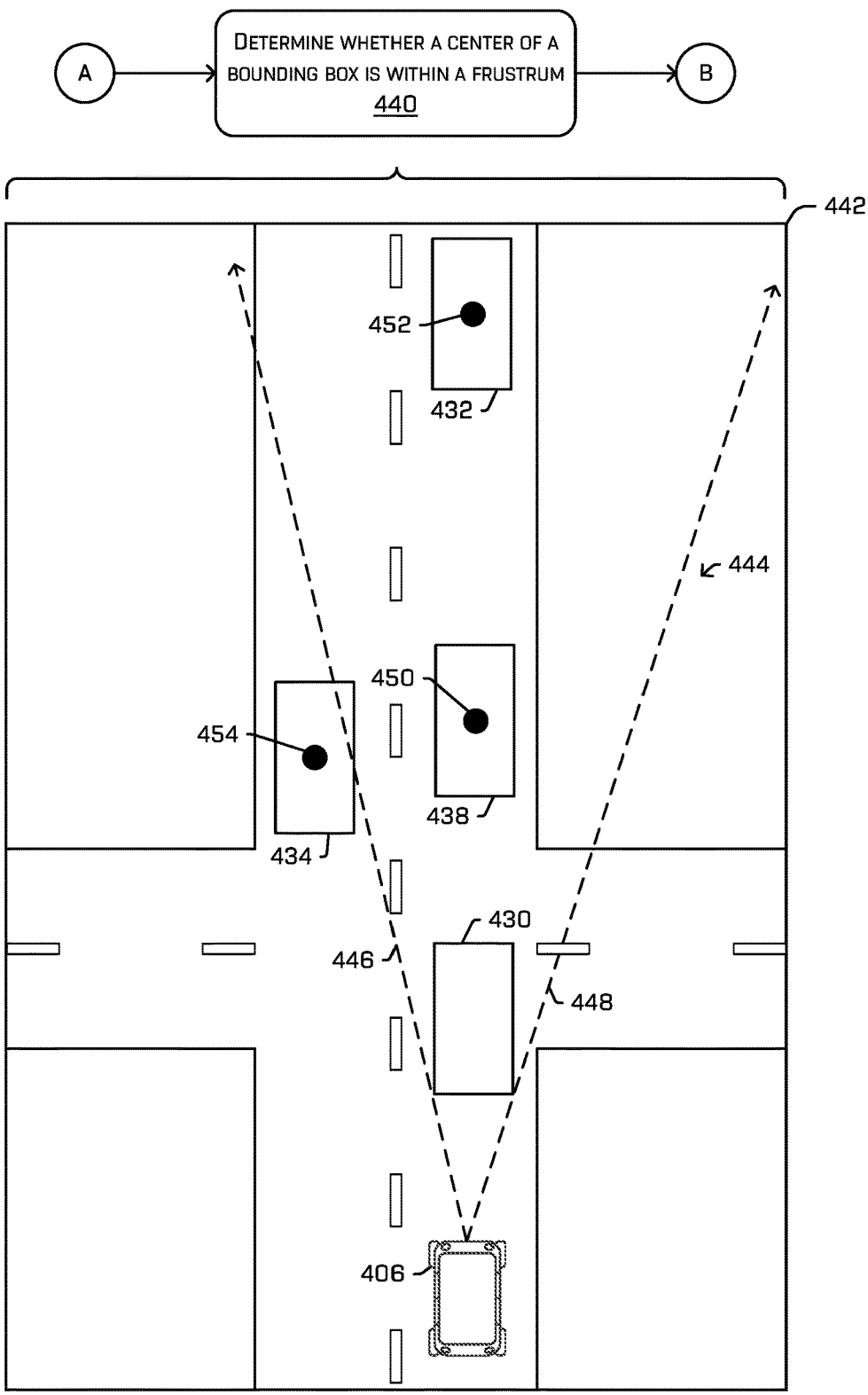
Figure 4C:
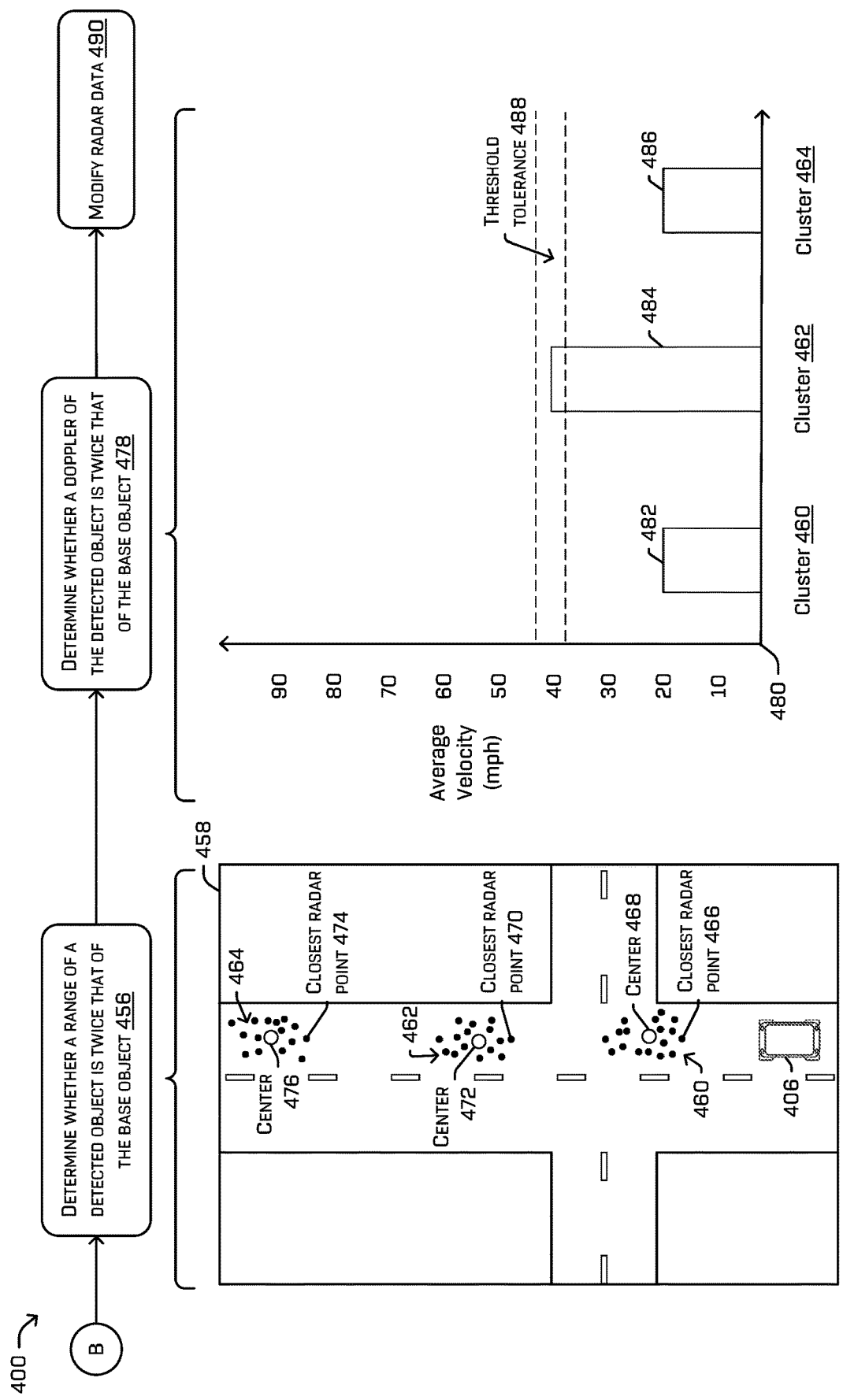

FIGS. 4A-4C illustrates a pictorial flow diagram of an example process 400 for receiving radar data, detecting double bounce object detections, and modifying the radar data based on the double bounce object detections. As described above, some or all the operations in the example process 400 may be performed by a radar management component that is similar or identical to the radar management component 202 described throughout. As discussed above, the radar management component 202 may be integrated into a radar device, simulation component, perception component, a prediction component, a planning component, and/or any other components and systems within an autonomous vehicle.

FIG. 4A illustrates a vehicle receiving sensor data of an environment and filtering out objects that are not within a range of azimuth values.

At operations 402, the radar management component may receive radar data. For example, box 404 illustrates a vehicle 406 (such as an autonomous vehicle) navigating an environment and capturing radar data reflected from a plurality of objects. In this example, the environment may include a first object 408, a second object 410, a third object 412, and a fourth object 414. As shown in box 404, the first object 408 may be a vehicle, the second object 410 may be a vehicle, the third object 412 may be a vehicle, and the fourth object 414 may be a vehicle. However, in other examples there may be more or less objects. Further, in other examples, the objects may be any other type of static or dynamic object.

In some examples, the box 404 may also include radar data captured by one or more radar devices located on the vehicle 406. Specifically, the vehicle 406 may receive radar points proximate to and/or associated with radar detections of the objects within the environment. For example, the vehicle 406 may receive the radar points 416 that correspond to the first object 408, the radar points 418 that correspond to the second object 410, the radar points 420 that correspond to the third object 412, and the radar points 422 that correspond to the fourth object 414. Additionally, the vehicle 406 may receive additional radar points 424 that are not associated with the objects within the environment. In such instances, the radar points 416, the radar points 418, the radar points 420, the radar points 422, and the radar points 424 are all included in the radar data captured by the vehicle 406.

At operation 426, the radar management component may determine whether a bounding box associated with a detected object is in front of the vehicle 406. The radar management component may input the radar data into a machine-learning model configured to output object detections and/or bounding boxes associated therewith. In such instances, the radar management component may receive, from the machine-learning model, one or more object detections and/or one or more associated bounding boxes. For example, box 428 illustrates the environment with bounding boxes representing detected objects. In this example, the box 428 includes a bounding box 430 corresponding to the first object 408, a bounding box 432 corresponding to the second object 410, a bounding box 434 corresponding to the third object 412, and a bounding box 436 corresponding to the fourth object 414. Further, the radar points 424 may correspond to an object detection represented by bounding box 438.

In some instances, the radar management component may determine whether any of the bounding boxes are within a region of interest which may be represented by a range of azimuth values. A region of interest may be any portion of the environment that is of importance to the vehicle. Important regions may include areas used in route planning, safety critical areas, occluded areas, and/or any other area. In such instances, the radar management component may determine a range of azimuth values (e.g., region of interest) within which double bounce radar detections may be located. The range of azimuth values may be based on a location and/or angle of the radar devices. For instances, as shown in box 428, the vehicle 406 may use the front center radar device. Further, the range of azimuth values may be from −60° to 60° in front of the vehicle. However, in other examples the range of azimuth values may differ.

In some examples, the radar management component may determine whether a bonding box is within the range of azimuth values. For example, the radar management component may determine that a bounding box is within the range of azimuth values based on any one of the whole bounding box being within the azimuth values, a center of the bounding box being within the range of azimuth values, a portion of the bounding box being within the range of azimuth values, and/or any other factor. If a bounding box is determined to be outside the range of azimuth values, the radar management component may filter out such bounding boxes, object detections, and/or radar points associated thereto. In these instances, bounding boxes outside the range of azimuth values are unlikely to be double bounce radar detections. Filtering out such object detections may reduce processing requirements and/or compute resources or compute time.

FIG. 4B illustrates a vehicle determining whether bounding boxes representative of object detections are located within a frustrum.

At operation 440, the radar management component may determine whether a center of a bounding box is within a frustrum. For example, box 442 may illustrate a frustrum determined by the extend of a base object. In this example, the vehicle 406 may determine a frustrum 444 from a radar device located on a front center portion of the vehicle 406. However, in other examples the frustrum 444 may be based on a radar device located at one or more other locations (e.g., corner, side, etc.) of the vehicle 406. As shown, the frustrum 444 is defined by the extent of the bounding box 430, which in this case may be the base object. For instance, the frustrum 444 may include a first side 446 of the frustrum 444 that is defined by a first side of the bounding box 430, and a second side 448 of the frustrum 444 that is defined by a second side of the bounding box 430.

In some examples, the radar management component may determine whether the centers of the bounding boxes are located within the frustrum 444. The radar management component may identify the center of the bounding boxes based on accessing the bounding box information provided by the machine-learning model and/or from any other component storing the bounding box information. As shown, the bounding box 438 may have a center 450, the bounding box 432 may have a center 452, and the bounding box 434 may have a center 454. As shown in box 442, the center 450 of the bounding box 438 is located within the frustrum 444, the center 452 of the bounding box 432 is located within the frustrum 444, and the center 454 of the bounding box 434 is located outside of the frustrum 444. As such, the bounding box 438 and the bounding box 432 and the associated object detections satisfy the azimuth double bounce criteria.

FIG. 4C illustrates modifying radar data based on a vehicle determining whether a detected object satisfies the range and velocity double bounce criteria.

At operation 456, the radar management component may determine whether a range of a detected object is twice that of the base object. For example, box 458 illustrates a vehicle determining the range to detected objects based on clusters of radar points associated with the detected objects. In this example, the box 458 includes a cluster 460 of radar points that correspond to the object detection of the first object 408, a cluster 462 of radar points that correspond to the object detection of the set of radar points 424, and a cluster 464 that correspond to the object detection of the second object 410.

In some instances, the radar management component may determine a range value for some or all the detected objects. As described above, to determine the range of the object detection based on a cluster of radar points, the radar management component may determine a weighted range based on the range of the closest radar point in the cluster and a center of the cluster. As shown in box 458, the radar management component may determine that the radar point 466 is the closest radar point within the cluster 460 while also determining the center 468 of the cluster 460, the radar point 470 may be the closest radar point of the cluster 462 while also determining the center 472 of the cluster 462, and the radar point 474 is the closest radar point of the cluster 464 while also determining the center 476 of the cluster 464. In some instances, the radar management component may determine a first range of the object detection corresponding to the cluster 460 based on the range of the radar point 466 and a range of the center 468, a second range of the object detection corresponding to the cluster 462 based on the range of the radar point 470 and the range of the center 472, and a third range of the object detection corresponding to the cluster 464 based on the range of the radar point 474 and the range of the center 476.

In some instances, the radar management component may determine whether the object detections have a range that is twice the range of the base object (e.g., cluster 460) based on determining if a difference between the ranges is within a threshold tolerance. For instance, the radar management component may determine that the object detection corresponding to the cluster 462 has a range that is twice that of the base object by subtracting half of the second range from the first range, and determining that the result is within a threshold tolerance. As such, the object detection corresponding to the cluster 462 may satisfy the range double bounce criteria. Further, the radar management component may determine that the object detection corresponding to the cluster 464 does not have a range that is twice that of the base object based on subtracting half of the third range from the first range, and determining that the result is outside the threshold tolerance. As such, the object detection corresponding to the cluster 464 does not satisfy the range double bounce criteria.

At operation 478, the radar management component may determine whether a doppler of the detected object is twice that of the base object. For example, the example graph 480 illustrates the average relative velocity for multiple object detections. In this example, the cluster 460 may have an average relative velocity 482 (e.g., relative doppler) of approximately 20 mph, the cluster 462 may have an average relative velocity 484 of approximately 40 mph, and the cluster 464 may have an average relative velocity 486 of over 20 mph.

In some instances, the radar management component may determine whether the object detections have a relative velocity that is twice the relative velocity of the base object (e.g., cluster 460) based on determining if a difference between the relative velocities is within a threshold tolerance 488. For instance, the radar management component may determine that the object detection corresponding to the cluster 462 has a relative velocity that is approximately twice that of the base object (e.g., cluster 460) by subtracting half of the average relative velocity 484 from the average relative velocity 482, and determining that the result is within a threshold tolerance 488. As such, the object detection corresponding to the cluster 462 may satisfy the velocity double bounce criteria. Further, the radar management component may determine that the object detection corresponding to the cluster 464 does not have an average relative velocity that is twice that of the base object based on subtracting half of the average relative velocity 486 from the average relative velocity 482, and determining that the result is outside the threshold tolerance 488. As such, the object detection corresponding to the cluster 464 does not satisfy the velocity double bounce criteria.

At operation 490, the radar management component may modify the radar data based on an object detection being identified as a double bounce object detection. The radar management component may determine that a detected object is false-positive double bounce object detection based on the object detection satisfying the azimuth, range, and velocity double bounce criteria. In this case, the object detection corresponding to the cluster 462 satisfied the azimuth, range, and velocity double bounce criteria and as such, the radar management component may identify the cluster 462 (e.g., radar points 424) as a false-positive object detection and modify the radar data accordingly. Further, the radar management component may determine that the object detection corresponding to the cluster 464 did not satisfy the range or velocity double bounce criteria and as such, the radar management component may determine that such radar points 418 do not indicate a false positive double bounce object detection.

Figure 5:
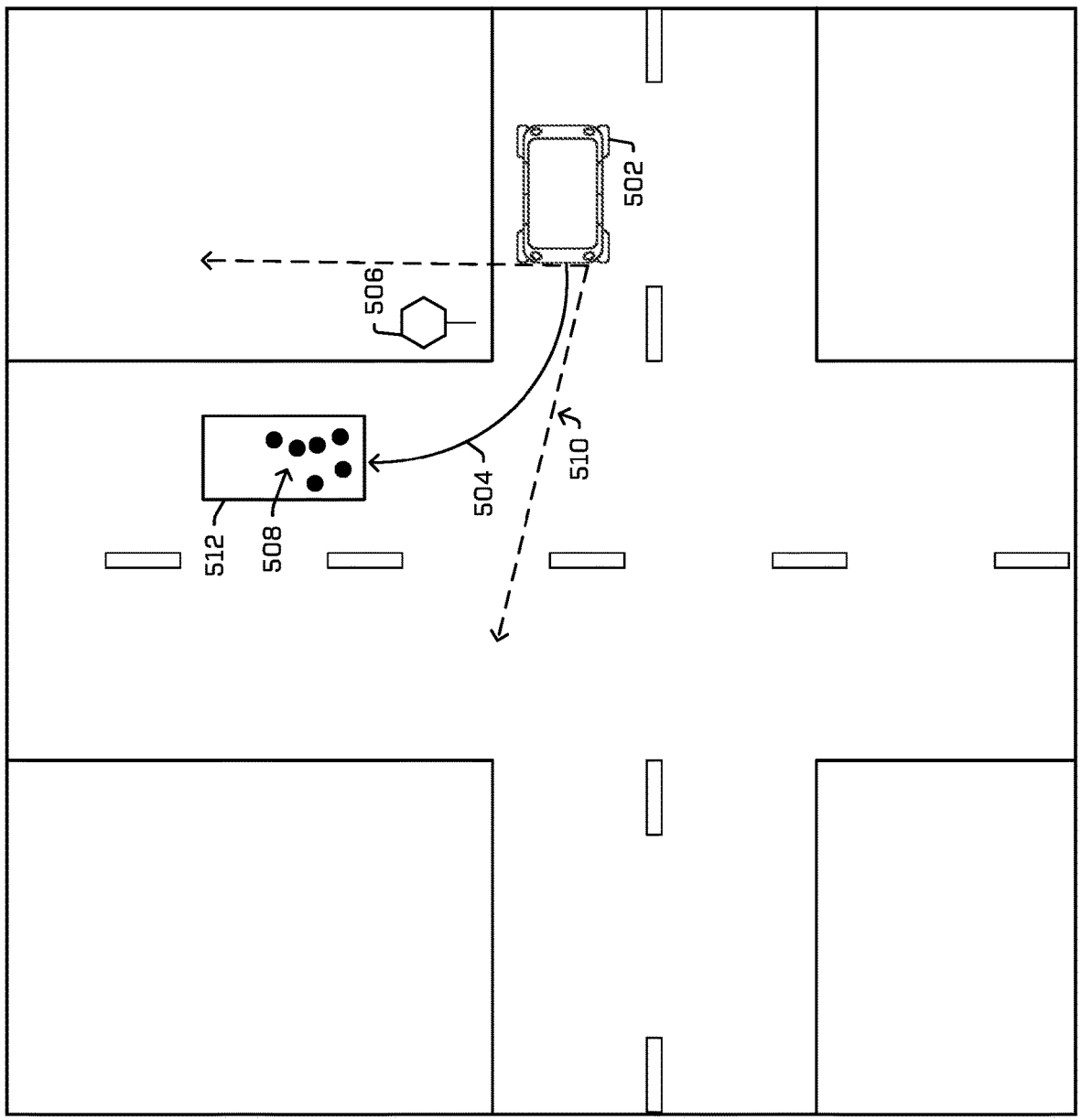
FIG. 5 illustrates an example environment of a vehicle detecting a double bounce object detection based on occlusion information of one or more other sensor modalities, in accordance with one or more examples of the disclosure.

FIG. 5 illustrates an example environment 500 of a vehicle detecting a double bounce object detection based on occlusion information of one or more other sensor modalities. Specifically, FIG. 5 illustrates a double bounce scenario where the double bounce reflection is caused by an object other than a vehicle.

In this example, the example environment 500 includes a vehicle 502. The vehicle 502 may be approaching a junction within the example environment 500 while following the trajectory 504. The trajectory 504 may instruct the vehicle 502 to turn to the right upon entering the junction. In this example, the example environment 500 may also include an object 506 that is proximate the vehicle 502. As shown, the object 506 may be a sign; however, in other examples the object 506 may be any other type of static object.

In some examples, the vehicle 502 may receive radar data 508 from one or more radar sensors located on the vehicle 502. As shown, the radar data 508 may be located in the lane to which the vehicle 502 is approaching. The vehicle 502 may input the radar data 508 to a machine-learning model configured to output a bounding box and/or object detection. As shown, upon analyzing the radar data 508, the vehicle 502 may determine that the radar data 508 is associated with an object detection represented by the bounding box 512. However, due to the limited size of the object 506, the object 506 may not be identified as an object which may be used as a base object (as described above). In such instances, the vehicle 502 may determine whether one or more other sensor devices have a line of sight with the object detection corresponding to the radar data 508. For instance, the vehicle may determine a field of view 510 for a second sensor device (e.g., radar device, lidar device, image capturing device, etc.) and determine whether the object detection associated with the radar data 508 is present, or if the object detection is in an occluded region of the sensor device. If the object detection is present according to the sensor device, the vehicle 502 may determine that the object detection is not a double bounce detection. In contrast, if the object detection is not present according to the sensor device, the vehicle 502 may determine that the object detection may be a double bounce detection. In this case, the vehicle 502 may determine, based on using an alternative sensor device, that the object detection is not present. In such cases, the vehicle 502 may determine that the radar data 508 are indicative of a double bounce radar detection. In other cases, the vehicle 502 may use one or more sensor modalities, map data, and/or historical data (e.g., common area for double bounce detections) to assist in identifying the double bounce object detection.

Figure 6:
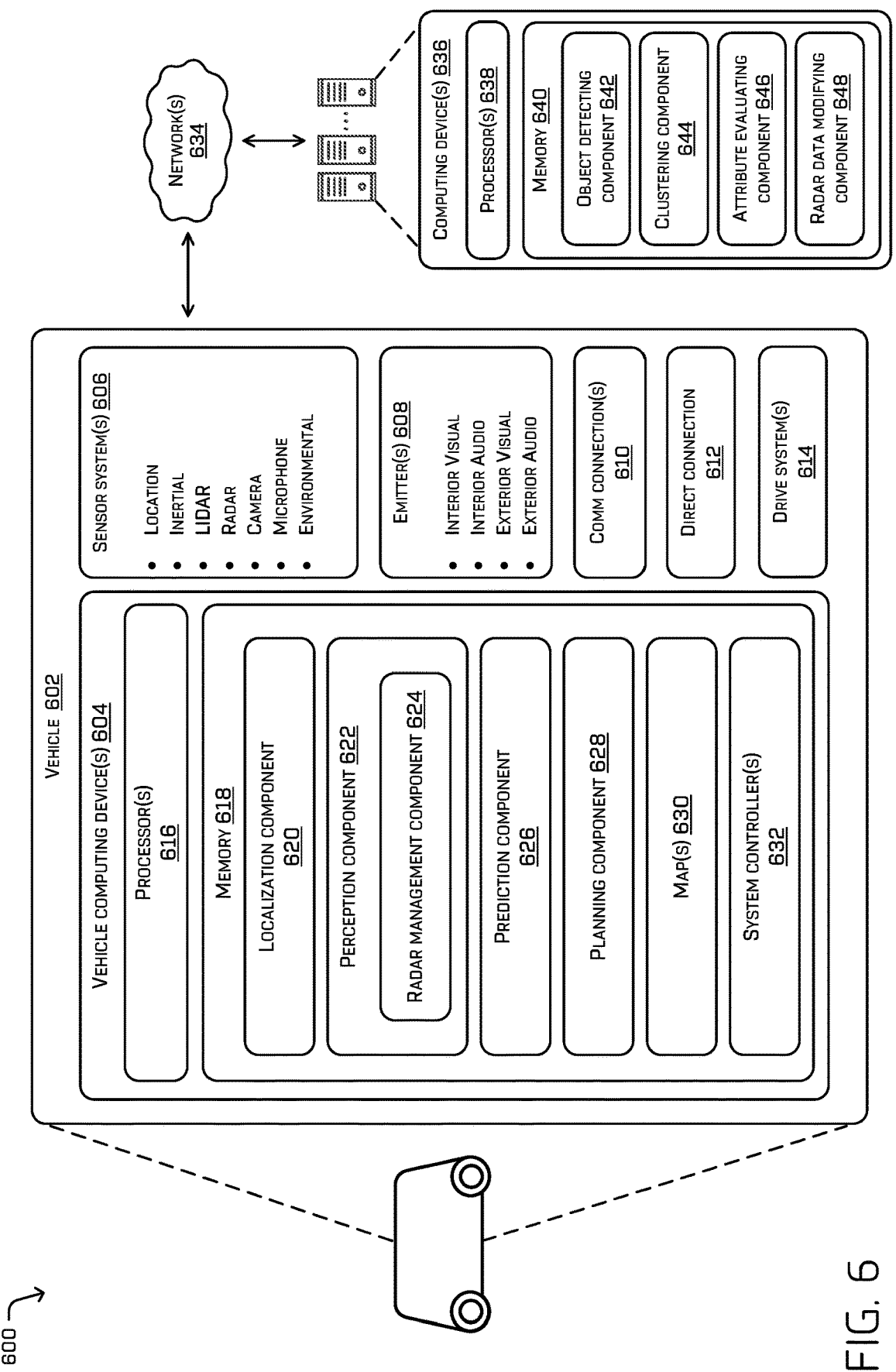
FIG. 6 depicts a block diagram of an example system for implementing various techniques described herein.

FIG. 6 is a block diagram of an example system 600 for implementing the techniques described herein. In at least one example, the system 600 may include a vehicle, such as vehicle 602. The vehicle 602 may include one or more vehicle computing devices 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the processor(s) 616. In the illustrated example, the vehicle 602 is an autonomous vehicle; however, the vehicle 602 could be any other type of vehicle, such as a semi-autonomous vehicle, or any other system having at least an image capture device (e.g., a camera-enabled smartphone). In some instances, the autonomous vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification.

In the illustrated example, the memory 618 of the vehicle computing device 604 stores a localization component 620, a perception component 622 including a radar management component 624, a prediction component 626, a planner component 628, one or more system controllers 632, and one or more maps 630 (or map data). Though depicted in FIG. 6 as residing in the memory 618 for illustrative purposes, it is contemplated that the localization component 620, the perception component 622 including the radar management component 624, the prediction component 626, the planner component 628, system controller(s) 632, and/or the map(s) may additionally, or alternatively, be accessible to the vehicle 602 (e.g., stored on, or otherwise accessible by, memory remote from the vehicle 602, such as, for example, on memory 640 of one or more computing device 636 (e.g., a remote computing device)). In some examples, the memory 640 may include an object detecting component 642, a clustering component 644, an attribute evaluating component 646, and a radar data modifying component 648.

In at least one example, the localization component 620 may include functionality to receive sensor data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 630, and may continuously determine a location and/or orientation of the vehicle 602 within the environment. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 602. In some instances, the localization component 620 may provide data to various components of the vehicle 602 to determine an initial position of the vehicle 602 for determining the relevance of an object to the vehicle 602, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 626 may generate one or more probability maps representing prediction probabilities of possible locations of one or more objects in an environment. For example, the prediction component 626 may generate one or more probability maps for vehicles, pedestrians, animals, and the like within a threshold distance from the vehicle 602. In some instances, the prediction component 626 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 626 may generate predicted trajectories of objects (e.g., objects) in an environment. For example, the prediction component 626 may generate one or more predicted trajectories for objects within a threshold distance from the vehicle 602. In some examples, the prediction component 626 may measure a trace of an object and generate a trajectory for the object based on observed and predicted behavior.

In general, the planner component 628 may determine a path for the vehicle 602 to follow to traverse through an environment. For example, the planner component 628 may determine various routes and trajectories and various levels of detail. For example, the planner component 628 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 628 may generate an instruction for guiding the vehicle 602 along at least a portion of the route from the first location to the second location. In at least one example, the planner component 628 may determine how to guide the vehicle 602 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 628 may select a trajectory for the vehicle 602.

In other examples, the planner component 628 may alternatively, or additionally, use data from the localization component 620, the perception component 622, and/or the prediction component 626 to determine a path for the vehicle 602 to follow to traverse through an environment. For example, the planner component 628 may receive data (e.g., object data) from the localization component 620, the perception component 622, and/or the prediction component 626 regarding objects associated with an environment. In some examples, the planner component 628 receives data for relevant objects within the environment. Using this data, the planner component 628 may determine a route to travel from a first location (e.g., a current location) to a second location (e.g., a target location) to avoid objects in an environment. In at least some examples, such a planner component 628 may determine there is no such collision-free path and, in turn, provide a path that brings vehicle 602 to a safe stop avoiding all collisions and/or otherwise mitigating damage.

The radar management component 624 may be perform any of the techniques described with respect to any of FIGS. 1-5 above with respect to modifying radar data based on detecting one or more false-positive double bounce detections.

In at least one example, the vehicle computing device 604 may include one or more system controllers 632, which may be configured to control steering, propulsion, braking, safety, emitters, communication, and other systems of the vehicle 602. The system controller(s) 632 may communicate with and/or control corresponding systems of the drive system(s) 614 and/or other components of the vehicle 602.

The memory 618 may further include one or more maps 630 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 630. That is, the map(s) 630 may be used in connection with the localization component 620, the perception component 622, the prediction component 626, and/or the planner component 628 to determine a location of the vehicle 602, detect objects in an environment, generate routes, determine actions and/or trajectories to navigate within an environment.

In some examples, the one or more maps 630 may be stored on a remote computing device(s) (such as the computing device(s) 636) accessible via network(s) 634. In some examples, multiple maps 630 may be stored based on, for example, a characteristic (e.g., type of entity, time of day, day of week, season of the year, etc.). Storing multiple maps 630 may have similar memory requirements, but increase the speed at which data in a map may be accessed.

In some instances, aspects of some or all of the components discussed herein may include any models, techniques, and/or machine-learned techniques. For example, in some instances, the components in the memory 618 (and the memory 640, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or in the alternative, the sensor system(s) 606 may send sensor data, via the one or more networks 634, to the one or more computing device(s) 636 at a particular frequency, after a lapse of a predetermined period of time, in near real-time, etc.

The vehicle 602 may also include one or more emitters 608 for emitting light and/or sound. The emitter(s) 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connections 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., computing device 636, other nearby vehicles, etc.) and/or one or more remote sensor system(s) for receiving sensor data. The communications connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as network(s) 634. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive module with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622 including the radar management component 624, the prediction component 626, the planner component 628, the one or more system controllers 632, and the one or more maps 630 may process sensor data, as described above, and may send their respective outputs, over the one or more network(s) 634, to the computing device(s) 636. In at least one example, the localization component 620, the perception component 622 including the radar management component 624, the prediction component 626, the planner component 628, the one or more system controllers 632, and the one or more maps 630 may send their respective outputs to the computing device(s) 636 at a particular frequency, after a lapse of a predetermined period of time, in near real-time, etc.

In some examples, the vehicle 602 may send sensor data to the computing device(s) 636 via the network(s) 634. In some examples, the vehicle 602 may receive sensor data from the computing device(s) 636 and/or remote sensor system(s) via the network(s) 634. The sensor data may include raw sensor data and/or processed sensor data and/or representations of sensor data. In some examples, the sensor data (raw or processed) may be sent and/or received as one or more log files.

The computing device(s) 636 may include processor(s) 638 and a memory 640, which may include an object detecting component 642, a clustering component 644, an attribute evaluating component 646, and a radar data modifying component 648. In some examples, the memory 640 may store one or more of components that are similar to the component(s) stored in the memory 618 of the vehicle 602. In such examples, the computing device(s) 636 may be configured to perform one or more of the processes described herein with respect to the vehicle 602. In some examples, the object detecting component 642, the clustering component 644, the attribute evaluating component 646, and the radar data modifying component 648 may perform substantially similar functions as the radar management component 624.

The processor(s) 616 of the vehicle 602 and the processor(s) 638 of the computing device(s) 636 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and memory 640 are examples of non-transitory computer-readable media. The memory 618 and memory 640 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 636 and/or components of the computing device(s) 636 may be associated with the vehicle 602. That is, the vehicle 602 may perform one or more of the functions associated with the computing device(s) 636, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 7:
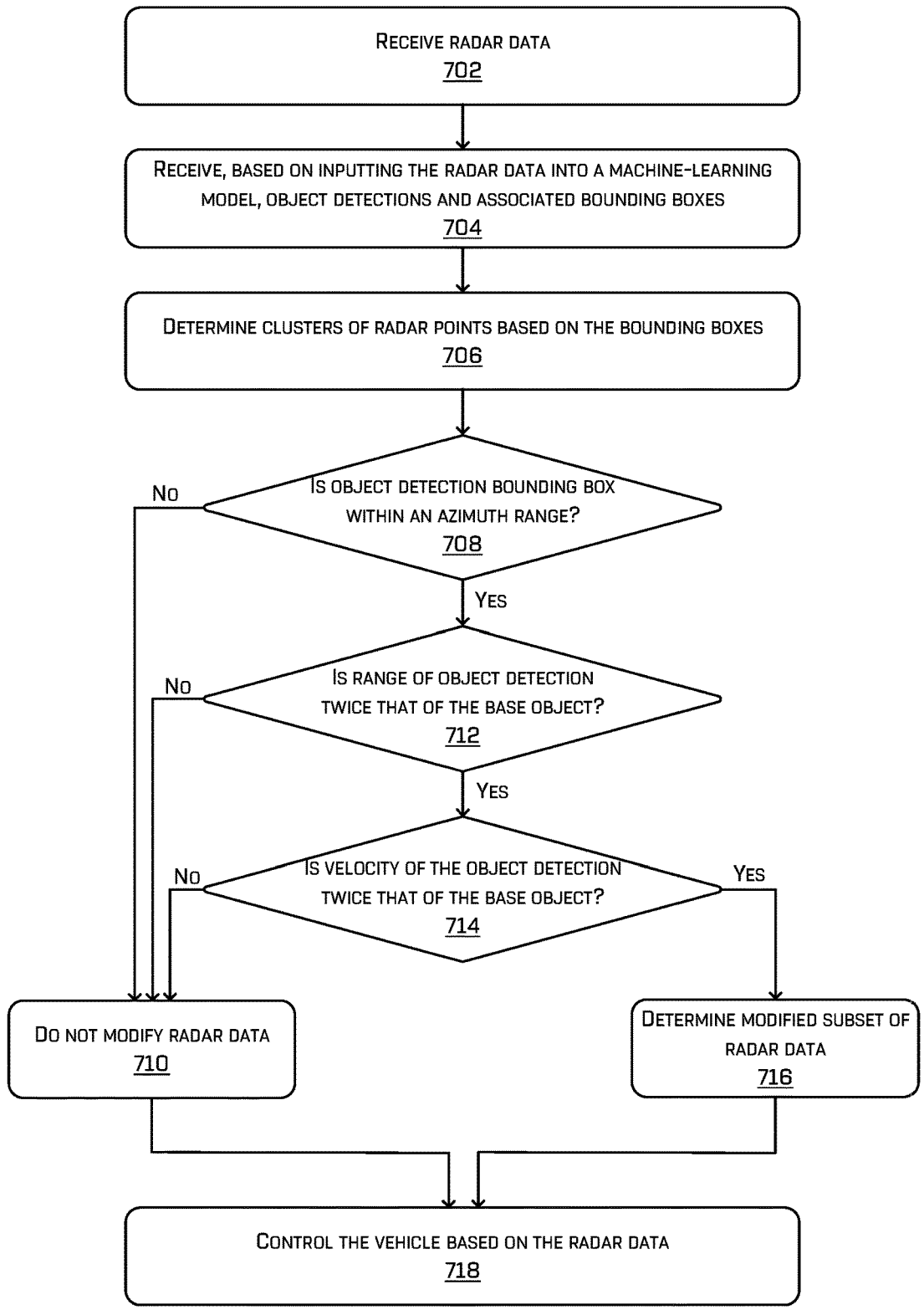
FIG. 7 is a flow diagram illustrating an example process of modifying radar data based on detecting the presence of a false positive double bounce object detection, in accordance with one or more examples of the disclosure.

FIG. 7 is a flow diagram illustrating an example process 700 of modifying radar data based on detecting the presence of a false-positive double bounce object detection. As described below, the process 700 may be performed by one or more computer-based components configured to implement various functionalities described herein. For instance, some or all of the operations of process 700 may be performed by a radar management component 202. As described above, a radar management component 202 may be integrated as an on-vehicle system in some examples. However, in other examples, the radar management component 202 may be integrated as a separate server-based system.

Process 700 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 702, the radar management component may receive radar data. In some examples, the autonomous vehicle may include multiple radar devices configured to receive radar data of the environment. Further, each radar device may provide unique radar data representative of the perspective of the radar device. Such radar devices may be a same or different type of radar device configured to capture different types (or parameters) of radar data, including but not limited to range data, azimuth data, doppler data, RCS data, elevation data, etc. In some examples, the radar data may include a set of radar points representative of radar detections of physical objects in the environment.

At operation 704, the radar management component may receive, based on inputting the radar data into a machine-learning model, object detections and associated bounding boxes. In some examples, an object detection may include various types of objects, such as a vehicle, a pedestrian, a cyclist, a sign, and/or any other type of object. The bounding box may be a minimum volume cuboid which encompasses an object. The two-or three-dimensional bounding box provides information about the type of object, the spatial location (e.g., azimuth, range, elevation, etc.) of the object, an orientation of the object, a center of the bounding box, as well as the size for the object it contains.

At operation 706, the radar management component may determine clusters of radar points based on the bounding boxes. The radar management component may cluster the radar points such that a cluster includes the radar points located proximate to and/or within a bounding box. For example, the radar management component may identify or otherwise determine azimuth value(s) and/or range value(s) of the bounding box. In such examples, the radar management component may determine a cluster (e.g., subset) of radar points based on identifying radar points with azimuth and/or range values that fall within the azimuth and/or range values of the bounding box. In such instances, the bounding box and the cluster of radar points may be associated with the same object.

In some examples, the radar management component may identify a base object prior to performing operations related to the double bounce criteria. A base object may be an actual object detection that is located between the vehicle and the other detected objects. In some examples, the radar management component may select or otherwise determine one or more detected objects to be the base object. In such instances, the radar management component may perform the techniques described herein based on a first base object, and perform the techniques additional times based on determining or otherwise selecting a second base object. Of course, the radar management component may perform the double bounce filtering techniques one or more times, utilizing one or more different base objects from the perspective of one or more different radar devices.

At operation 708, the radar management component may determine whether an object detection is located within a frustrum. In some examples, the radar management component may determine whether an object detection satisfies the double bounce azimuth criteria. The double bounce azimuth criteria may include determining whether the object detection is located within a frustrum defined by the base object. The frustrum may be a cone shaped region covering a range of azimuth values within which double bounce object detections may be located. For example, the radar management component may determine a frustrum extending from the radar device to the bounding box associated with the base object. In some instances, the sides of the frustrum may be defined by the extent of the bounding box of the base object. Upon determining the frustrum, the radar management component may determine whether the bounding box of the object detection is located within the frustrum. In such cases, the radar management component may identify a center of the bounding box (of the object detection), and determine whether the center is located within the frustrum. If the center of the bounding box of the object detection is not located within the frustrum (708: No), the radar management component may determine that the candidate object is not a false-positive double bounce object detection. At operation 710, the radar management component may determine that the radar data associated with the object detection does not include a double bounce object detection. As such, the radar management component may not modify the radar data.

In contrast, if the center of the bounding box of the object detection is located within the frustrum (708: Yes), the radar management component may determine that detected object satisfies the double bounce azimuth criteria and may be a double bounce object detection.

At operation 712, the radar management component may determine whether the range of the detected object is twice that of the base object. For example, when determining the range of the base object, the radar management component may identify a radar point of the cluster (corresponding to the base object) that is closest (e.g., has the smallest range) to the radar device, in addition to identifying a center of the cluster. The radar management component may determine the center of the cluster by averaging range and/or azimuth data of the radar points within the cluster. Based on identifying the closest radar point and the center of the cluster, the radar management component may determine a first range value for the closest radar point and a second range value for the center of the cluster. In such examples, the radar management component may determine an overall range from the radar device to the base object by determining a weighted range based on the first range value and the second range value. For instance, the radar management component may apply different weight values to the two range values and aggregate the results. In some examples, the radar management component may perform the same or similar range determining operations to determine the overall range from the radar device to the object detection.

Based on determining a first overall range of the base object and a second overall range of the object detection, the radar management component may determine if the second overall range is twice that of the first overall range. For example, the radar management component may subtract half of the second overall range from the first overall range and compare the result to a threshold range (e.g., threshold tolerance). If the overall range of the object detection is twice that of the base object, the result of subtracting half of the second overall range from the first overall range may be approximately zero. The threshold range may be determined based on a variety of factors, such as a diagonal, horizontal, and/or vertical length (or a portion thereof) of the bounding box of the base object, an azimuth of the base object from the perspective of the radar device (e.g., increase threshold range based on azimuth values further from "0", decrease threshold range based on azimuth values closer to "0", etc.), a velocity (or relative velocity) of the vehicle or the base object, a distance between the vehicle and the based object, and/or any other factor. If the range of the object detection is not twice that of the base object (712: No), the radar management component may determine that the object detection is not a double bounce object detection. At operation 710, the radar management component may determine that the radar data associated with the object detection does not include a double bounce object detection. As such, the radar management component may not modify the radar data.

In contrast, if the range of the object detection is twice that of the base object (712: Yes), the radar management component may determine that the object detection satisfies the double bounce range criteria and may be a double bounce object detection.

At operation 714, the radar management component may determine whether the that the object detection has a relative velocity that is twice that of the relative velocity of the base object. For example, when determining the relative velocity of the base object, the radar management component may determine a first velocity of the cluster of radar points corresponding to the base object. The radar management component may determine the first velocity by averaging the individual velocity values for some or all radar points within the cluster. Further, the radar management component may determine a second velocity of the cluster of radar points corresponding to the object detection by averaging the individual velocity values for some or all radar points within the cluster. Upon determining the first velocity of the base object and the second velocity of the object detection, the radar management component may determine a first relative velocity for the base object and a second relative velocity of the object detection. The first relative velocity may be determined by comparing the velocity of the vehicle with the first velocity of the base object, and the second relative velocity may be determined by comparing the velocity of the vehicle with the second velocity of the object detection.

In some examples, the radar management component may determine whether the second relative velocity of the object detection is twice the first relative velocity of the base object. For example, the radar management component may subtract half of the second relative velocity from the first relative velocity and compare the result to a threshold range (e.g., threshold tolerance). The threshold range may be determined based on a variety of factors, such as a velocity (or a portion thereof) of the vehicle, base object, and/or object detection, the environment type, the road geometry, and/or any other factor. If the relative velocity of the object detection is not twice that of the base object (714: No), the radar management component may determine that the object detection is not a double bounce object detection. At operation 710, the radar management component may determine that the radar data associated with the object detection does not include a double bounce object detection. As such, the radar management component may not modify the radar data.

In contrast, if the relative velocity of the object detection is twice that of the base object (714: Yes), the radar management component may determine that the object detection satisfies the double bounce velocity criteria and may be a double bounce object detection. If the object detection has satisfied the double bounce criteria for azimuth, range, and velocity, the radar management component may determine that the object detection is a false-positive double bounce object detection.

At operation 716, the radar management component may modify the cluster of radar points. Based on the radar management component determining that the object detection is a false-positive double bounce object detection, the radar management component may modify the cluster of radar points corresponding to the object detection. In some examples, the radar management component may modify the cluster based on a variety of techniques, such as removing and/or discarding the cluster of radar points, assigning a low confidence level to the cluster of radar points, assigning a label indicating that the cluster is a double bounce object, and/or any other technique. Upon modifying the cluster of radar points, the radar management component may send the modified subset of radar points to one or more of perception, prediction, and/or planning components for further processing. In such examples, the modified subset of radar data may be analyzed and processed in detecting objects, classifying objects, predicting trajectories, and/or planning future vehicle actions. At operation 718, the radar management component may control the vehicle based on the radar data and/or the modified radar data.

EXAMPLE CLAUSES

A: A system comprising: one or more processors; and one or more non-transitory computer-readable media storing computer-executable instructions that, when executed, cause the one or more processors to perform operations comprising: receiving, from a radar sensor associated with an autonomous vehicle, radar data of an environment, the radar data including a set of radar points; inputting the set of radar points into a machine-learning model; receiving, from the machine-learning model, a first bounding box associated with a first object and a second bounding box associated with a second object; determining, based at least in part on the first bounding box, a frustrum extending from the radar sensor and encompassing the first bounding box; determining that a center of the second bounding box is located within the frustrum; determining a first cluster of the set of radar points associated with the first object and a second cluster of the radar points associated with the second object; determining a first range associated with the first cluster and a second range associated with the second cluster; determining a first velocity associated with the first cluster and a second velocity associated with the second cluster; determining, based at least in part on the first range and the second range, that a range difference is within a first threshold range; determining, based at least in part on the first velocity and the second velocity, that a velocity difference is within a second threshold range; determining, based at least in part on the center of the second bounding box being within the frustrum, the range difference being within the first threshold range, and the velocity difference being within the second threshold range, that the second cluster of radar points is a false positive object; and controlling the autonomous vehicle based at least in part on the second cluster being the false positive object.

B: The system of paragraph A, wherein determining that the second cluster is a false positive object comprises at least one of: removing the second cluster of radar points from the set of radar points, or assigning a confidence level to the second cluster of radar points.

C: The system of paragraph A, wherein determining the first range comprises: identifying a first radar point of the first cluster that includes a third range that is less than a fourth range of a second radar point of the first cluster; determining a fifth range associated with a second center of the first cluster; and determining, based at least in part on the third range and the fifth range, a weighted range value associated with the first object.

D: The system of paragraph A, wherein the first threshold range is determined based at least in part on at least one of: a length of a diagonal of the first bounding box, a third velocity of the autonomous vehicle or the first object, a distance between the autonomous vehicle and the first object, or an azimuth angle of the first object.

E: The system of paragraph A, wherein determining the first velocity is based at least in part on: determining an average velocity of velocity values associated with the first cluster of radar points.

F: One or more non-transitory computer-readable media storing instructions executable by one or more processors, wherein the instructions, when executed, cause the one or more processors to perform operations comprising: receiving, from a radar sensor associated with a vehicle, radar data of an environment; inputting the radar data into a machine-learning model; receiving, from the machine-learning model, a first bounding box associated with a first object and a second bounding box associated with a second object; determining, based at least in part on the first bounding box, a range of azimuth values; determining that the second bounding box is located within the range of azimuth values; determining a first portion of the radar data that is associated with the first object and a second portion of the radar data that is associated with the second object; determining, based at least in part on the first portion and the second portion, a range difference; determining that the range difference is within a threshold range; determining, based at least in part on the second bounding box being within a range of azimuth values and the range difference being within the threshold range, that the second portion of radar data is a double bounce radar detection; and determining, based at least in part on the second portion being a double bounce radar detection, a modified subset of the radar data.

G: The one or more non-transitory computer-readable media of paragraph F, wherein determining the range difference is based at least in part on determining a first range associated with the first portion, wherein determining the first range comprises: identifying a first radar point of the first portion that includes a second range that is less than a third range of a second radar point of the first portion; determining, based on identifying a center of the of the first portion, a fourth range associated with the center of the first portion; and determining, based at least in part on the second range and the fourth range, a weighted range value associated with the first object.

H: The one or more non-transitory computer-readable media of paragraph F, wherein the threshold range is determined based at least in part on at least one of: a length of a diagonal of the first bounding box, a third velocity of the vehicle and the first object, a distance between the vehicle and the first object, or an azimuth angle of the first object.

I: The one or more non-transitory computer-readable media of paragraph F, wherein determining the modified subset of radar data comprises at least one of: removing the second portion of radar points from the radar data, or assigning a confidence level to the second portion of radar data.

J: The one or more non-transitory computer-readable media of paragraph F, wherein the threshold range is a first threshold range, and wherein determining the modified subset of radar data is further based at least in part on: determining, based at least in part on the first portion and the second portion, a velocity difference; and determining that the velocity difference is within a second threshold range.

K: The one or more non-transitory computer-readable media of paragraph J, wherein the second threshold range is determined based at least in part on a velocity of the first object.

L: The one or more non-transitory computer-readable media of paragraph J, wherein determining the velocity difference is based at least in part on determining a velocity associated with the first portion, wherein determining the velocity is based at least in part on: determining an average velocity of velocity values associated with the first portion of radar data.

M: The one or more non-transitory computer-readable media of paragraph F, the operations further comprising: controlling the vehicle based at least in part on the modified subset of radar data.

N: The one or more non-transitory computer-readable media of paragraph F, wherein detecting the first object and the second object is based at least in part on receiving segmentation information associated with the radar data.

O: The one or more non-transitory computer-readable media of paragraph F, wherein the range of azimuth values is represented by a frustrum that extends from the radar sensor and encompasses the first bounding box.

P: The one or more non-transitory computer-readable media of paragraph F, wherein determining the range difference is based at least in part on determining a first range associated with the first portion, wherein determining the first range is based at least in part on a first location of the radar sensor and a second location of the first portion of radar data.

Q: A method comprising: receiving, from a radar sensor associated with a vehicle, radar data of an environment; inputting the radar data into a machine-learning model; receiving, from the machine-learning model, a first bounding box associated with a first object and a second bounding box associated with a second object; determining, based at least in part on the first bounding box, a range of azimuth values; determining that the second bounding box is located within the range of azimuth values; determining a first portion of the radar data that is associated with the first object and a second portion of the radar data that is associated with the second object; determining, based at least in part on the first portion and the second portion, a range difference; determining that the range difference is within a threshold range; determining, based at least in part on the second bounding box being within a range of azimuth values and the range difference being within the threshold range, that the second portion of radar data is a double bounce radar detection; and determining, based at least in part on the second portion being a double bounce radar detection, a modified subset of the radar data.

R: The method of paragraph Q, wherein determining the range difference is based at least in part on determining a first range associated with the first portion, wherein determining the first range comprises: identifying a first radar point of the first portion that includes a second range that is less than a third range of a second radar point of the first portion; determining, based on identifying a center of the of the first portion, a fourth range associated with the center of the first portion; and determining, based at least in part on the second range and the fourth range, a weighted range value associated with the first object.

S: The method of paragraph Q, wherein determining the modified subset of radar data comprises at least one of: removing the second portion of radar points from the radar data, or assigning a confidence level to the second portion of radar data.

T: The method of paragraph Q, wherein the threshold range is a first threshold range, and wherein determining the modified subset of radar data is further based at least in part on: determining, based at least in part on the first portion and the second portion, a velocity difference; and determining that the velocity difference is within a second threshold range.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described.

The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the one or more processors to perform operations comprising:

receiving, from a radar sensor associated with an autonomous vehicle, radar data of an environment, the radar data including a set of radar points;

inputting the set of radar points into a machine-learning model;

receiving, from the machine-learning model, a first bounding box associated with a first object and a second bounding box associated with a second object;

determining, based at least in part on the first bounding box, a frustrum extending from the radar sensor and encompassing the first bounding box;

determining that a center of the second bounding box is located within the frustrum;

determining a first cluster of the set of radar points associated with the first object and a second cluster of the set of radar points associated with the second object;

determining a first range associated with the first cluster and a second range associated with the second cluster;

determining a first velocity associated with the first cluster and a second velocity associated with the second cluster;

determining, based at least in part on the first range and the second range, that a range difference is within a first threshold range;

determining, based at least in part on the first velocity and the second velocity, that a velocity difference is within a second threshold range;

determining, based at least in part on the center of the second bounding box being within the frustrum, the range difference being within the first threshold range, and the velocity difference being within the second threshold range, that the second cluster of the set of radar points is a false positive object; and controlling the autonomous vehicle based at least in part on the second cluster being the false positive object.

2. The system of claim 1, wherein determining that the second cluster is a false positive object comprises at least one of:

removing the second cluster of the set of radar points from the set of radar points, or assigning a confidence level to the second cluster of the set of radar points.

3. The system of claim 1, wherein determining the first range comprises:

identifying a first radar point of the first cluster that includes a third range that is less than a fourth range of a second radar point of the first cluster;

determining a fifth range associated with a second center of the first cluster; and determining, based at least in part on the third range and the fifth range, a weighted range value associated with the first object.

4. The system of claim 1, wherein the first threshold range is determined based at least in part on at least one of:

a length of a diagonal of the first bounding box, a third velocity of the autonomous vehicle or the first object, a distance between the autonomous vehicle and the first object, or an azimuth angle of the first object.

5. The system of claim 1, wherein determining the first velocity is based at least in part on:

determining an average velocity of velocity values associated with the first cluster of the set of radar points.

6. One or more non-transitory computer-readable media storing instructions executable by one or more processors, wherein the instructions, when executed, cause the one or more processors to perform operations comprising:

receiving, from a radar sensor associated with a vehicle, radar data of an environment;

inputting the radar data into a machine-learning model;

receiving, from the machine-learning model, a first bounding box associated with a first object and a second bounding box associated with a second object;

determining, based at least in part on the first bounding box, a range of azimuth values;

determining that the second bounding box is located within the range of azimuth values;

determining a first portion of the radar data that is associated with the first object and a second portion of the radar data that is associated with the second object;

determining, based at least in part on the first portion and the second portion, a range difference;

determining that the range difference is within a threshold range;

determining, based at least in part on the second bounding box being within the range of azimuth values and the range difference being within the threshold range, that the second portion of radar data is a double bounce radar detection; and determining, based at least in part on the second portion being the double bounce radar detection, a modified subset of the radar data.

7. The one or more non-transitory computer-readable media of claim 6, wherein determining the range difference is based at least in part on determining a first range associated with the first portion, wherein determining the first range comprises:

identifying a first radar point of the first portion that includes a second range that is less than a third range of a second radar point of the first portion;

determining, based on identifying a center of the first portion, a fourth range associated with the center of the first portion; and determining, based at least in part on the second range and the fourth range, a weighted range value associated with the first object.

8. The one or more non-transitory computer-readable media of claim 6, wherein the threshold range is determined based at least in part on at least one of:

a length of a diagonal of the first bounding box, a third velocity of the vehicle and the first object, a distance between the vehicle and the first object, or an azimuth angle of the first object.

9. The one or more non-transitory computer-readable media of claim 6, wherein determining the modified subset of the radar data comprises at least one of: removing the second portion of radar points from the radar data, or assigning a confidence level to the second portion of radar data.

10. The one or more non-transitory computer-readable media of claim 6, wherein the threshold range is a first threshold range, and wherein determining the modified subset of the radar data is further based at least in part on:

determining, based at least in part on the first portion and the second portion, a velocity difference; and determining that the velocity difference is within a second threshold range.

11. The one or more non-transitory computer-readable media of claim 10, wherein the second threshold range is determined based at least in part on a velocity of the first object.

12. The one or more non-transitory computer-readable media of claim 10, wherein determining the velocity difference is based at least in part on determining a velocity associated with the first portion, wherein determining the velocity is based at least in part on:
determining an average velocity of velocity values associated with the first portion of radar data.

13. The one or more non-transitory computer-readable media of claim 6, the operations further comprising:
controlling the vehicle based at least in part on the modified subset of the radar data.

14. The one or more non-transitory computer-readable media of claim 6, wherein detecting the first object and the second object is based at least in part on receiving segmentation information associated with the radar data.

15. The one or more non-transitory computer-readable media of claim 6, wherein the range of azimuth values is represented by a frustrum that extends from the radar sensor and encompasses the first bounding box.

16. The one or more non-transitory computer-readable media of claim 6, wherein determining the range difference is based at least in part on determining a first range associated with the first portion, wherein determining the first range is based at least in part on a first location of the radar sensor and a second location of the first portion of radar data.

17. A method comprising:
receiving, from a radar sensor associated with a vehicle, radar data of an environment;
inputting the radar data into a machine-learning model;
receiving, from the machine-learning model, a first bounding box associated with a first object and a second bounding box associated with a second object;
determining, based at least in part on the first bounding box, a range of azimuth values;
determining that the second bounding box is located within the range of azimuth values;
determining a first portion of the radar data that is associated with the first object and a second portion of the radar data that is associated with the second object;
determining, based at least in part on the first portion and the second portion, a range difference;
determining that the range difference is within a threshold range;
determining, based at least in part on the second bounding box being within the range of azimuth values and the range difference being within the threshold range, that the second portion of radar data is a double bounce radar detection; and
determining, based at least in part on the second portion being the double bounce radar detection, a modified subset of the radar data.

18. The method of claim 17, wherein determining the range difference is based at least in part on determining a first range associated with the first portion, wherein determining the first range comprises:
identifying a first radar point of the first portion that includes a second range that is less than a third range of a second radar point of the first portion;
determining, based on identifying a center of the first portion, a fourth range associated with the center of the first portion; and
determining, based at least in part on the second range and the fourth range, a weighted range value associated with the first object.

19. The method of claim 17, wherein determining the modified subset of the radar data comprises at least one of:
removing the second portion of radar points from the radar data, or
assigning a confidence level to the second portion of radar data.

20. The method of claim 17, wherein the threshold range is a first threshold range, and wherein determining the modified subset of the radar data is further based at least in part on:
determining, based at least in part on the first portion and the second portion, a velocity difference; and
determining that the velocity difference is within a second threshold range.

* * * * *